(12) United States Patent
Huang et al.

(10) Patent No.: US 8,799,549 B2
(45) Date of Patent: Aug. 5, 2014

(54) METHOD FOR TRANSMITTING DATA BETWEEN TWO COMPUTER SYSTEMS

(75) Inventors: Wei-Shun Huang, Taipei Hsien (TW); Teh-Chern Chou, Taipei Hsien (TW)

(73) Assignee: Infortrend Technology, Inc., Zhonghe Dist., New Taipei (TW)

( * ) Notice: Subject to any disclaimer, the term of this patent is extended or adjusted under 35 U.S.C. 154(b) by 1120 days.

(21) Appl. No.: 12/704,522

(22) Filed: Feb. 11, 2010

(65) Prior Publication Data

US 2010/0211715 A1    Aug. 19, 2010

Related U.S. Application Data

(60) Provisional application No. 61/152,267, filed on Feb. 13, 2009.

(51) Int. Cl.
*G06F 12/00* (2006.01)

(52) U.S. Cl.
USPC .............. 710/313; 710/74; 711/114; 711/162

(58) Field of Classification Search
CPC ....... G06F 3/065; G06F 3/067; G06F 3/0689; G06F 11/1456; G06F 11/2076
USPC ................. 710/62–64, 72–74, 300, 305, 306, 710/311–315; 709/312, 313, 316, 238, 245
See application file for complete search history.

(56) References Cited

U.S. PATENT DOCUMENTS

| | | | |
|---|---|---|---|
| 6,353,874 B1 * | 3/2002 | Morein | 711/118 |
| 7,315,911 B2 * | 1/2008 | Davies et al. | 710/260 |
| 7,464,174 B1 * | 12/2008 | Ngai | 709/234 |
| 7,475,166 B2 * | 1/2009 | Arndt et al. | 710/23 |
| 7,543,096 B2 * | 6/2009 | Davies | 710/268 |
| 7,606,933 B2 * | 10/2009 | Reinhard et al. | 709/238 |
| 7,669,000 B2 * | 2/2010 | Sharma et al. | 710/310 |
| 7,870,301 B2 * | 1/2011 | Arndt et al. | 710/8 |
| 7,908,445 B2 * | 3/2011 | Schnapp et al. | 711/157 |
| 7,937,447 B1 * | 5/2011 | Cohen et al. | 709/212 |
| 7,984,180 B2 * | 7/2011 | Pope et al. | 709/238 |
| 8,001,266 B1 * | 8/2011 | Gonzalez et al. | 709/238 |
| 2006/0155883 A1 * | 7/2006 | Chou et al. | 710/3 |
| 2007/0022212 A1 * | 1/2007 | Fan | 709/238 |
| 2007/0130364 A1 * | 6/2007 | Joglekar et al. | 709/238 |
| 2013/0145072 A1 * | 6/2013 | Venkataraghavan et al. | 710/316 |

* cited by examiner

*Primary Examiner* — Brian Misiura
(74) *Attorney, Agent, or Firm* — Winston Hsu; Scott Margo

(57) ABSTRACT

A method for transmitting data between two storage virtualization controllers (SVCs) is disclosed in the present invention. The two SVCs comprising a first SVC and a second SVC, in which the first SVC comprises a first bus interface and a first memory, the second SVC comprises a second bus interface and a second memory, and an inter-controller communication channel (ICC) is established between the first bus interface and the second bus interface, the method comprising the steps of: transmitting, by the second SVC, a message via the ICC through the second bus interface to the first SVC, in which the message comprises a destination address of a block of the second memory, and the block is accessible; reading, by the first SVC, data in the first memory to be transmitted when the first SVC receives the message; transmitting, by the first SVC, the data to be transmitted and the destination address to the second SVC via the ICC through the first bus interface; and storing, by the second SVC, the transmitted data into the second memory according the destination address.

22 Claims, 27 Drawing Sheets

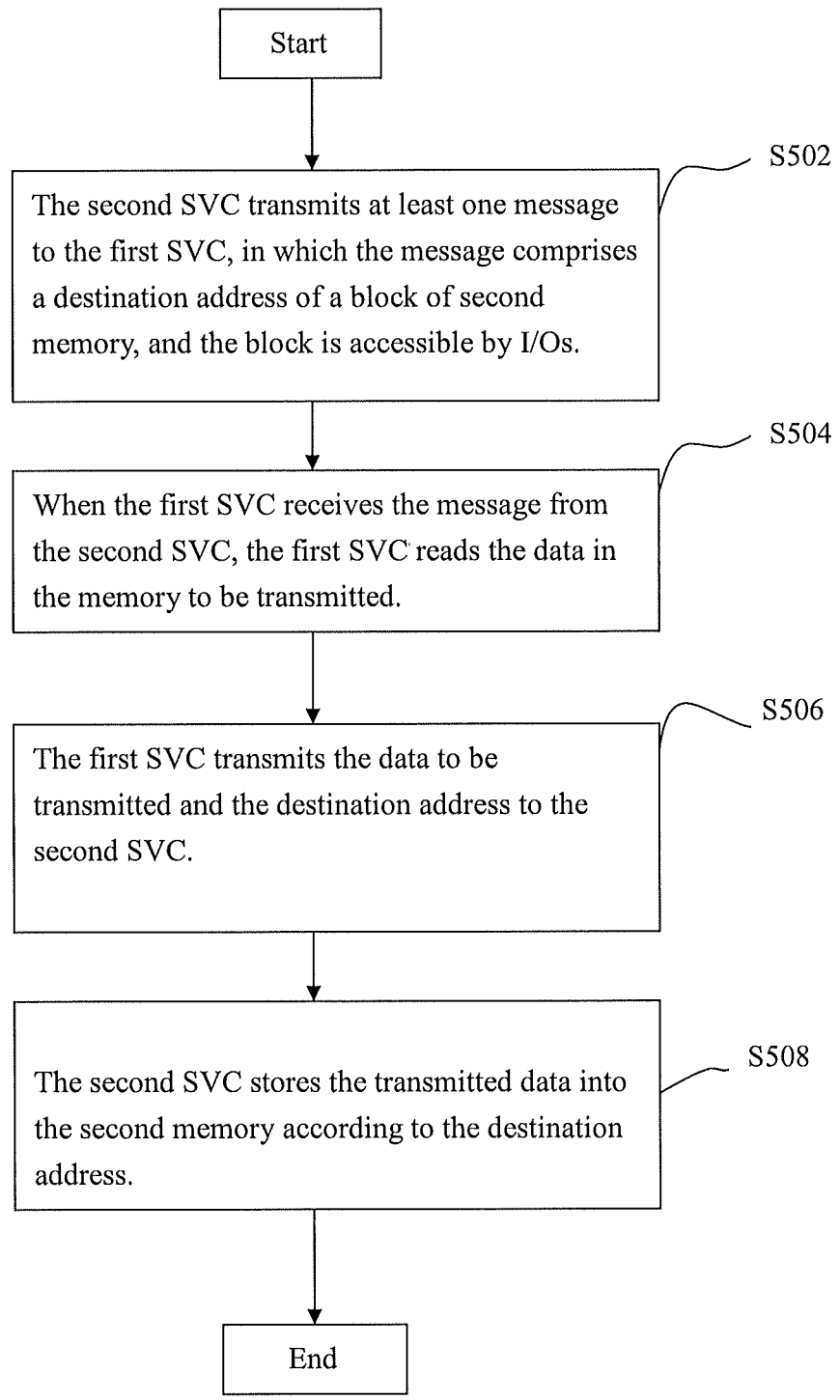
FIG..6

| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | +0 | | | | | | | | +1 | | | | | | | | +2 | | | | | | | | +3 | | | | | | | |
| | R | Fmt X 1 | | | MsgD | | | | R | TC | | | R | | | | T D | E P | Attr | | | R | | | 1 | | | | | | | |
| | Requester ID | | | | | | | | | | | | | | | | Tag | | | | | | | | Message Code-vendor_ defined | | | | | | | |
| | Reserved | | | | | | | | | | | | | | | | 00000200 | | | | | | | | Vendor ID | | | | | | | |

↑ destination address of first block

Vendor-defined message

Fig. 8B

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| | R | Fmt X 1 | | | MsgD | | | | R | TC | | | | | R | | T D | E P | Attr | | | R | | | 1 | | | | | | | |
| | Requester ID | | | | | | | | | | | | | | | Tag | | | | | | | | Message Code-vendor defined | | | | | | | |
| | Reserved | | | | | | | | | | | | | | | | | | | | | | | Vendor ID | | | | | | | |
| | 00000600 | | | | | | | | | | | | | | | | | | | | | | | | | | | | | | | |

Vendor-defined message

↑ destination address of third block

Fig. 8D

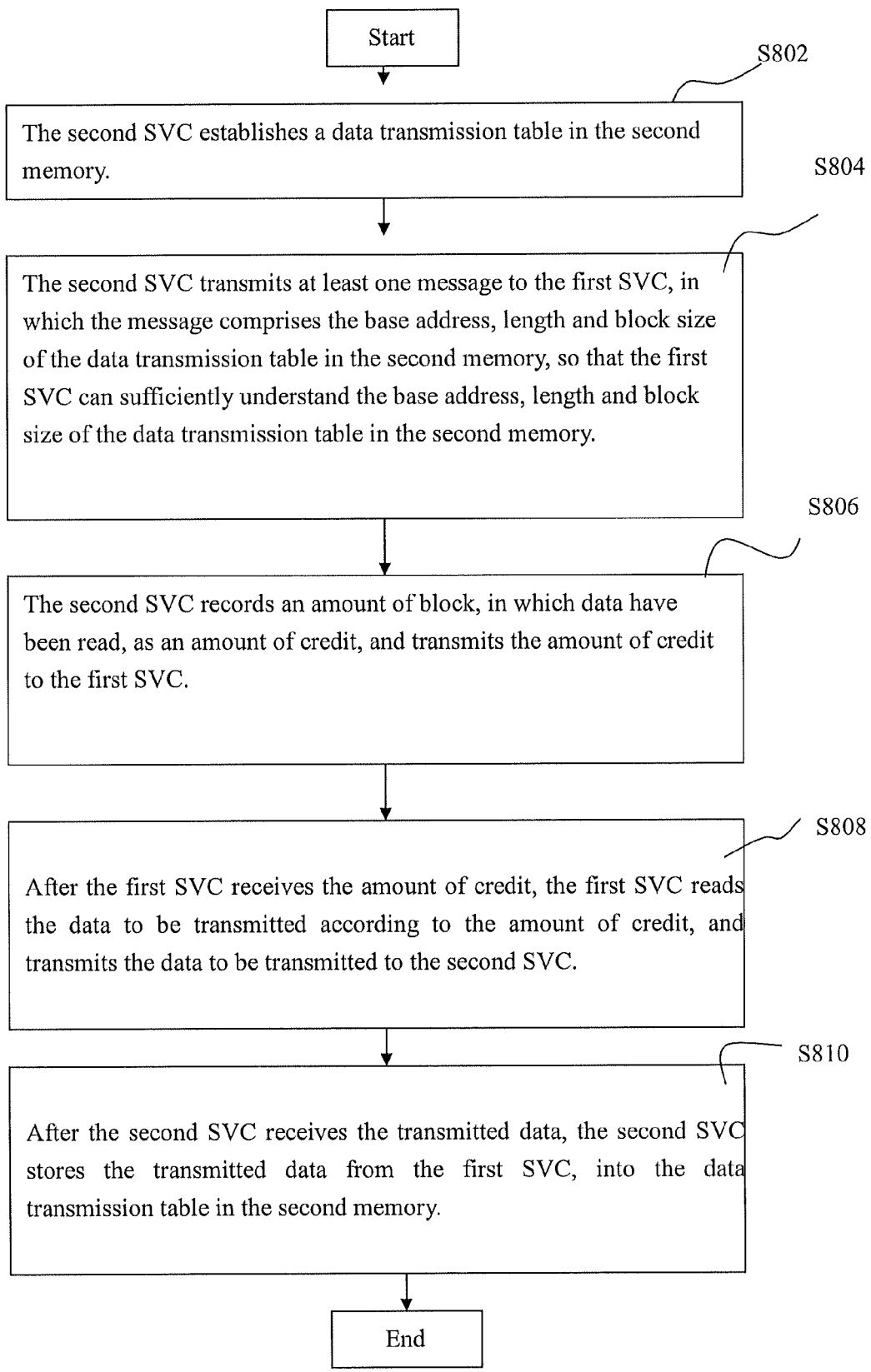
FIG..9

Vendor-defined message

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | Fmt X1 | | | MsgD | | | | R | TC | | | R | | | | TD | EP | Attr | | R | | | | 3 | | | | | | | |
| Requester ID | | | | | | | | | | | | | | | | Tag | | | | | | | | Message Code–vendor defined | | | | | | | |
| Reserved | | | | | | | | | | | | | | | | 000000000 | | | | | | | | Vendor ID | | | | | | | |
| 512 bytes | | | | | | | | | | | | | | | | | | | | | | | | | | | | | | | |

Fig. 10D

Vendor-defined message

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | Fmt X1 | | | MsgD | | | | R | TC | | | | R | | | TD EP | | Attr | | R | | | | 3 | | | | | | | |
| Requester ID | | | | | | | | | | | | | | | | Tag | | | | | | | | Message Code-vendor defined | | | | | | | |
| Reserved | | | | | | | | | | | | | | | | 00003200 | | | | | | | | | | | | | | | |
| 2 | | | | | | | | | | | | | | | | | | | | | | | | | | | | | | | |
| D3000000 | | | | | | | | | | | | | | | | | | | | | | | | | | | | | | | |

Fig. 10F

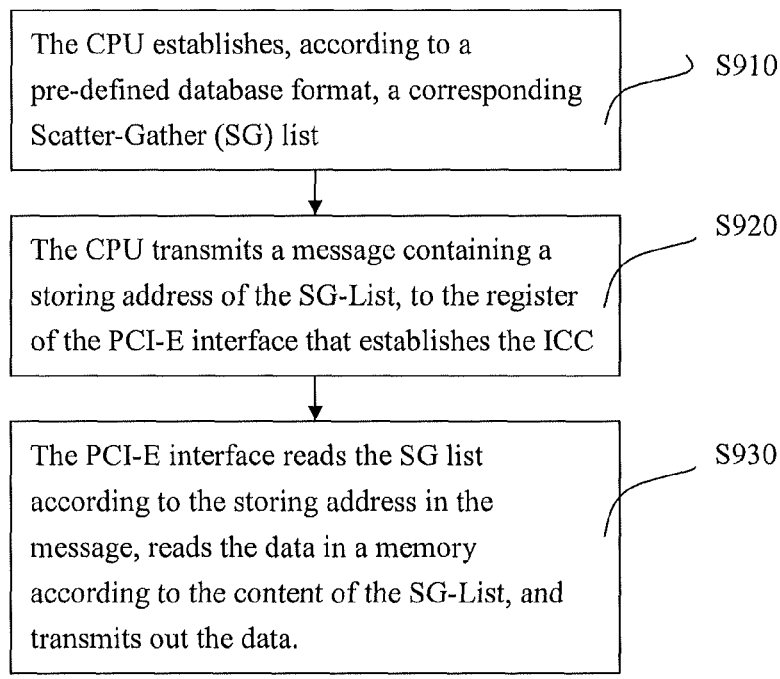

FIG.11

| B0 | B1 | B2 | B3 | B4 | B5 | B6 | B7 | B8-B11 | B11-B15 |
|---|---|---|---|---|---|---|---|---|---|
| INT | Next-SG-List-Addr | | | List-Entry-Count | Ints | | | | |
| Source-Base-Addr-0 | | | | Dir | Data-Length-0 | | | Destimation-Base-Addr-0 | |
| Source-Base-Addr-1 | | | | Dir | Data-Length-1 | | | Destimation-Base-Addr-1 | |
| · | | | | · | · | | | · | |
| · | | | | · | · | | | · | |
| · | | | | · | · | | | · | |
| · | | | | · | · | | | · | |

Field Definition:

INT: set "1" generate interrupt when transfer is complete.

Ints: set"1" generate interrupt at receiving end when transfer is complete.

Next-SG-List-Addr: Address of the header of next Scatter-Gather list. If this is the end of the linked list of lists, then this should be set to "0".

List-Entry-Count: Number of SG entries in list following this header.

Source-Base-Addr-N: Base address of data source.

Data-Length-N: Length of data to copy/process.

Dir: "1" for data out (write data) and "0" for data in (read data).

Dest-Base-Addr-N: Base address of data destination for a copy operation.

FIG.12

METHOD FOR TRANSMITTING DATA BETWEEN TWO COMPUTER SYSTEMS

BACKGROUND OF THE INVENTION

1. Field of the Invention

The present invention relates to a method for transmitting data, and in particular, to a method for transmitting data, especially control data, between two computer systems.

2. Description of the Related Art

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc. to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, in general, operates independently of the host.

The primary motivation in configuring a pair of external storage virtualization controllers (SVCs) into a redundant pair is to allow continued, uninterrupted access to data by a host (or more than one host) even in the event of a malfunction or failure of a single SVC, i.e., an abnormality occurs in a single SVC. This is accomplished by incorporating functionality into the SVCs that allow one controller to take over for the other in the event that the other becomes handicapped or completely incapacitated, i.e., an abnormality occurs in a single SVC.

Redundant storage virtualization controller pair can be configured in active-standby mode or active-active mode. In active-standby mode, a storage virtualization controller (known as a primary storage virtualization controller) presents, manages, and processes all I/O requests, while the other storage virtualization controller (known as a secondary storage virtualization controller) remains idle to back up the primary storage virtualization controller failure. In active-active mode, the two storage virtualization controllers present, manage, or process the I/O requests of various logical media unit in a redundant storage virtualization subsystem. Under active-active mode, the two storage virtualization controllers can replace each other when a malfunction occurs in the other storage virtualization controller. Active-active mode typically provides better performance, since the resources of both storage virtualization controllers (e.g., central processing unit time, internal bus bandwidth) are better able to handle more I/O requests than a single storage virtualization controller.

Regardless of the mode, a basic functionality of a redundant storage virtualization computer system is that when one storage virtualization controller therein has some troubles, the other storage virtualization controller may take over the tasks of the troubled one, such as continuing the data access to the direct access storage devices. An inter-controller communication channel ICC must be provided between the storage virtualization controllers to establish a redundant storage virtualization computer system, thereby transmitting messages therebetween via the inter-controller communication channel ICC. In addition, each storage virtualization controller should always know the latest working information of the other, that is, the two SVCs are almost in synchronization and the data in each are almost the same, so as to take over the functions from the other when there is a problem in the other.

Conventionally, the inter-controller communication channel ICC is implemented by FC-AL (Fibre Channel-Arbitrated Loop) or parallel small computer system interface (SCSI), or serial advanced technology attachment (SATA). The main reasons why interconnects or channels of such protocols is used is that these interconnects support connection with long distance and external connection capability, which facilitate connection between two independent devices.

FIG. 1 is a block diagram of a conventional redundant storage virtualization system. The first storage virtualization controller 100 comprises a redundant controller communication (RCC) interconnect controller 136 establishing an inter-controller communication channel (ICC) to the second storage virtualization controller 100'.

For accomplishing that each of the storage virtualization controllers knows the latest working information of and maintains the data synchronization with its mate (the other storage virtualization controller), in principle, one SVC has to allow its mate to know any change of data of its own such that the two SVCs may be almost in synchronization with each other, and therefore one SVC may take over the other SVC thoroughly, successfully, and immediately when the other SVC has some problems. As such, in some situations, the data transmission on the inter-controller communication channel ICC would be quite heavy. If there is no appropriate transmission method between the two storage virtualization controllers, for example, one storage virtualization controller has not finished executing data in its memory, while the other storage virtualization controller still transmits data, then memory of the receiving storage virtualization controller will overflow, which has great negative impact on system performance and data correctness. Therefore, it is a crucial issue to manage data transmission on the inter-controller communication channel ICC.

BRIEF SUMMARY OF THE INVENTION

A detailed description is given in the following embodiments with reference to the accompanying drawings.

It is an object of the present invention to provide a method for transmitting data between two storage virtualization controllers without causing overflow of memory of the receiving storage virtualization controller.

According to a first embodiment of the present invention, a method for transmitting data between two storage virtualization controllers (SVCs), the two SVCs comprising a first SVC and a second SVC, in which the first SVC comprises a first bus interface and a first memory, the second SVC comprises a second bus interface and a second memory, and an inter-controller communication channel (ICC) is established between the first bus interface and the second bus interface, the method comprising the steps of: transmitting, by the second SVC, a message via the ICC through the second bus interface to the first SVC, in which the message comprises a destination address of a block of the second memory, and the block is accessible; reading, by the first SVC, data in the first memory to be transmitted when the first SVC receives the message; transmitting, by the first SVC, the data to be transmitted and the destination address to the second SVC via the ICC through the first bus interface; and storing, by the second SVC, the transmitted data into the second memory according the destination address.

According to a second embodiment of the present invention, a method for transmitting data between two storage virtualization controllers (SVCs), the SVCs comprises a first SVC and a second SVC, in which the first SVC comprises a first bus interface and a first memory, and the second SVC comprises a second bus interface and a second memory, and an inter-controller communication channel (ICC) is established between the first bus interface and the second bus interface, the method comprising the steps of: establishing, by the second SVC, a data transmission table in the second memory; transmitting, by the second SVC, a message to the first SVC, in which the message comprises a base address, data length, and block size of the data transmission table in the second memory; recording a number of block, in which data have been read by the second SVC, as a number of credit; transmitting, by the second SVC, the number of credit to the first SVC; reading, by the first SVC, the data to be transmitted according to the number of credit, and transmitting the data to be transmitted, to the second SVC, when the first SVC receives the number of credit from the second SVC; and storing, by the second SVC, the transmitted data from the first SVC, into the data transmission table in the second memory of the second SVC.

According to a third embodiment of the present invention, a method for transmitting Scatter-Gather data (SG data) between two storage virtualization controllers (SVCs), the two SVCs comprising a first SVC and a second SVC, in which the first SVC comprises a first bus interface and a first memory, and the second SVC comprises a second bus interface and a second memory, and an inter-controller communication channel (ICC) is established between the first bus interface and the second bus interface, the method comprising the steps of: transmitting, by the second SVC, a message to the first SVC via the second bus interface through the ICC, when the second SVC performs a data in operation of the SG data, in which the message comprises a source base address and data length of the SG data; reading, by the first SVC, scattered data according to the source address and data length of the SG data and transmitting the scattered data to the second SVC via the first bus interface through the ICC, after the first SVC receives the message; and storing, by the second SVC, the scattered data into the second memory through the second bus interface.

According to one embodiment of the present invention, the first SVC reads the data in the first memory to be transmitted according to a source address and a byte count of the data to be transmitted.

According to one embodiment of the present invention, each of the SVCs comprises: a central processing circuit for performing an I/O operation in response to an I/O request from a host entity and for coupling to the other SVC via the bus interface; at least one I/O device interconnect controller coupled to the central processing circuit; at least one host-side port provided in the at least one I/O device interconnect controller for coupling to the host entity; at least one device-side port provided in the at least one I/O device interconnect controller for coupling to at least one physical storage device; and a memory coupled to the central processing circuit for buffering data transmitted between the host entity and the at least one physical storage device via the central processing circuit.

According to one embodiment of the present invention, the central processing circuit comprises: a central processing unit (CPU); and a CPU chipset which is an interface between the CPU and other electronic components, the CPU chipset comprising: the bus interface for coupling to the other SVC; an internal main bus which is used as a communication connection among said other electronic components in the CPU chipset for communicating data signals and control signals; and a CPU interface coupled to the CPU and the internal main bus for communicating between the CPU and the other electronic components; a memory controller coupled to the memory and the internal main bus, in which when the memory controller receives the data transmitted from the internal main bus, the memory controller stores the data into the memory, and the data in the memory is transmitted to the internal main bus via the memory controller; and an interface coupled to the at lease one I/O device interconnect controller and the internal main bus for being an interface therebetween.

According to one embodiment of the present invention, the CPU chipset further comprises a register belonging to the bus interface, a storage space of the register being used to be written by the CPU and used to transmit a message associated with data to the other SVC. According to one embodiment of the present invention, the register is provided in the bus interface.

According to one embodiment of the present invention, the first bus interface and the second bus interface are PCI-Express bus interfaces.

According to one embodiment of the present invention, the data to be transmitted relate to data regarding control data.

According to one embodiment of the present invention, further comprising the step of: transmitting, by the second SVC, the message to the first SVC, when one of blocks of the second memory of the second SVC is released, in which the message comprises the destination address of the released block.

According to one embodiment of the present invention, the message is a vendor-defined message or ignore message, both of which are defined by a PCI-Express.

According to one embodiment of the present invention, data of the data transmission table comprises the base address, length and block size.

According to one embodiment of the present invention, the storing step comprises step of storing the scattered data into the second memory according to a destination base address of the scattered data.

BRIEF DESCRIPTION OF DRAWINGS

The invention can be more fully understood by reading the subsequent detailed description and examples with references made to the accompanying drawings, wherein:

FIG. 6 is a flowchart of a method for data transmission according to the first embodiment of the present invention.

FIGS. 8B to 8D show the vendor-defined messages of the first embodiment of the present invention, in which the vendor-defined messages comprise different destination addresses of the second memory according to the first embodiment of the present invention.

FIG. 9 is a flowchart of a method for data transmission according to the second embodiment of the present invention.

FIGS. 10C to 10D show the vendor-defined message according to the second embodiment of the present invention, in which the vendor-defined message comprises a base address, length and block size of the second memory.

FIG. 10E to 10F show the vendor-defined message according to the present invention, in which the vendor-defined message comprises a source base address, data length and destination address of SG data.

FIG. 11 is a flowchart of a method for data transmission according to the present invention.

FIG. 12 shows memory allocation of exemplary SG-Lists.

DETAILED DESCRIPTION OF THE INVENTION

As technology advances, local buses evolve from peripheral component interconnect (PCI) bus to peripheral component interconnect extended (PCI-X) bus and peripheral component interconnect express (PCI-express) bus. PCI-Express bus differs from other local buses in that it delivers a breakthrough in external coupling. As the traditional local bus approaches, either it is impossible for a device to couple to an external device, or only limited coupling of a device to an external device through backplane wiring is permitted, and the transmission distance inherited by electric characteristics of such is also limited. With PCI-Express interface, not only can external coupling from a device to an external device for communication be implemented in cable connection, but also the transmission distance inherited by electric characteristics thereof can be as far as 7 meters.

Figure 1:
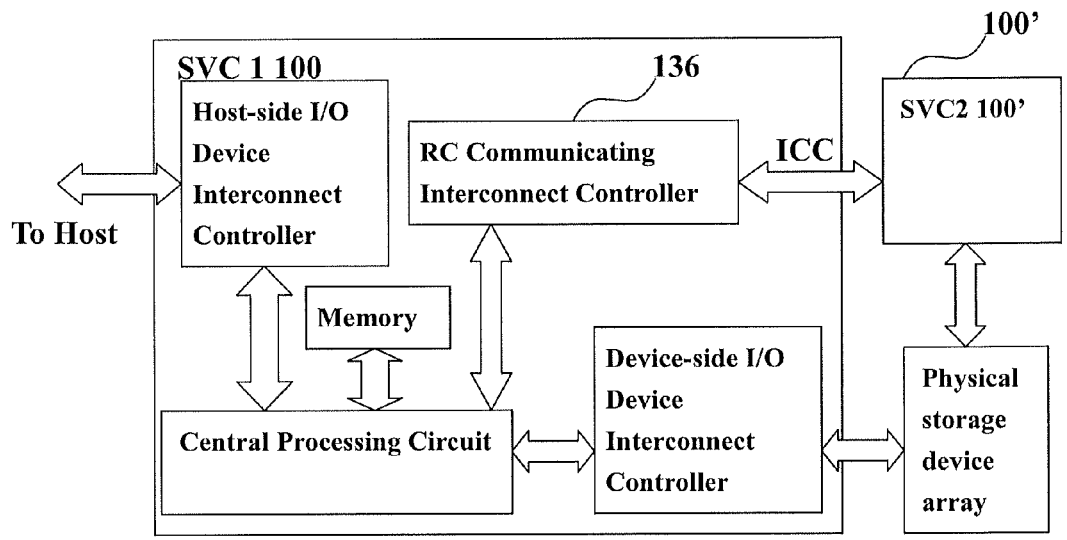
FIG. 1 is a block diagram of a conventional redundant external storage virtualization controller.
Figure 2:
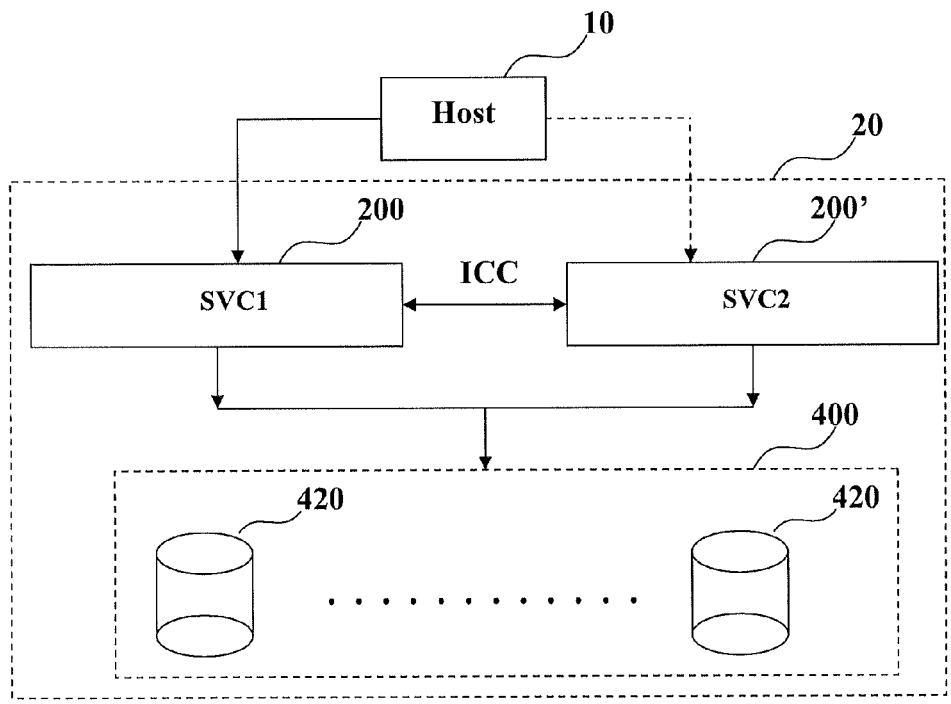
FIG. 2 is a block diagram of an exemplary storage virtualization computer system according to the present invention.

FIG. 2 is a block diagram of an exemplary redundant storage virtualization system in the invention, comprising a host entity 10 and redundant storage virtualization subsystem (SVS) 20. The storage virtualization subsystem 20 comprises a redundant virtualization controller pair (including the first storage virtualization controller (SVC1) 200, the second storage virtualization controller (SVC2) 200') and a plurality physical storage devices (PSDs)), where the SVC1 and SVC2 may be a RAID controller or a JBOD (Just a Bunch of Disks) emulator.

Although only one host entity 10 and one redundant storage virtualization subsystem 20 are coupled together in FIG. 2, in practice, multiple host entities 10 can be coupled to a single redundant storage virtualization subsystem 20, or a single host entity 10 can be coupled to multiple redundant storage virtualization subsystems 20, or multiple host entities 10 can be coupled to multiple redundant storage virtualization subsystems 20. The host entity 10 can be a computer such as a server system, workstation, personal computer or equivalent. Further, the host entity 10 can also be a storage virtualization controller.

Under the architecture of the redundant storage virtualization subsystem, an inter-controller communication channel (ICC) is provided between the SVC1 200 and SVC2 200' to exchange information therebetween. The reasons why the present invention uses PCI-Express are that PCI-Express is able to connect externally not only through a backplane, but also through an external cable for external transmission, and further, has a longer transmission distance; therefore, PCI-Express is suitable for external storage virtualization controller. When the first storage virtualization controller 200 has a problem such as breakdown, the other normal storage virtualization controller 200' takes over works therefrom, such that the first storage virtualization controller 200 can be repaired or replaced. The scope of the invention is not limited to PCI-Express, but can be applicable to any local bus adopted by the storage virtualization controller. For example, in the case where the two storage virtualization controllers are provided on the same printed circuit board, the PCI or PCI-X may be used to substitute for PCI-Express.

In an embodiment, all physical storage devices 420 in the redundant storage virtualization subsystem 20 are combined into a physical storage device array 400 (PSD array).

Figure 3A:
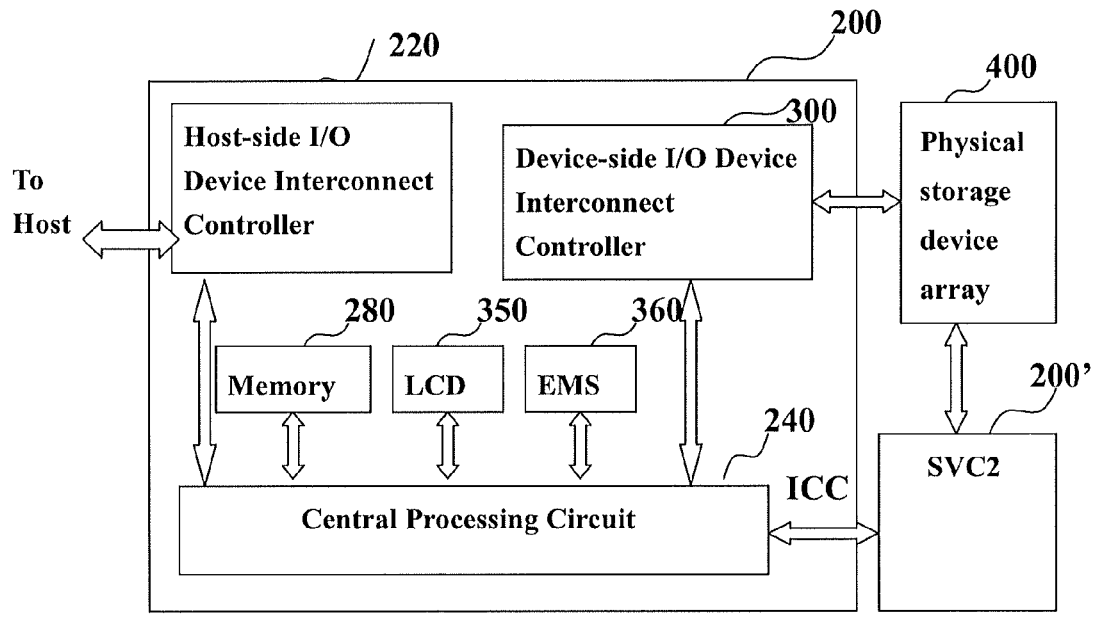
FIG. 3A is a block diagram of the first storage virtualization controller (SVC) according to the present invention.
Figure 3B:
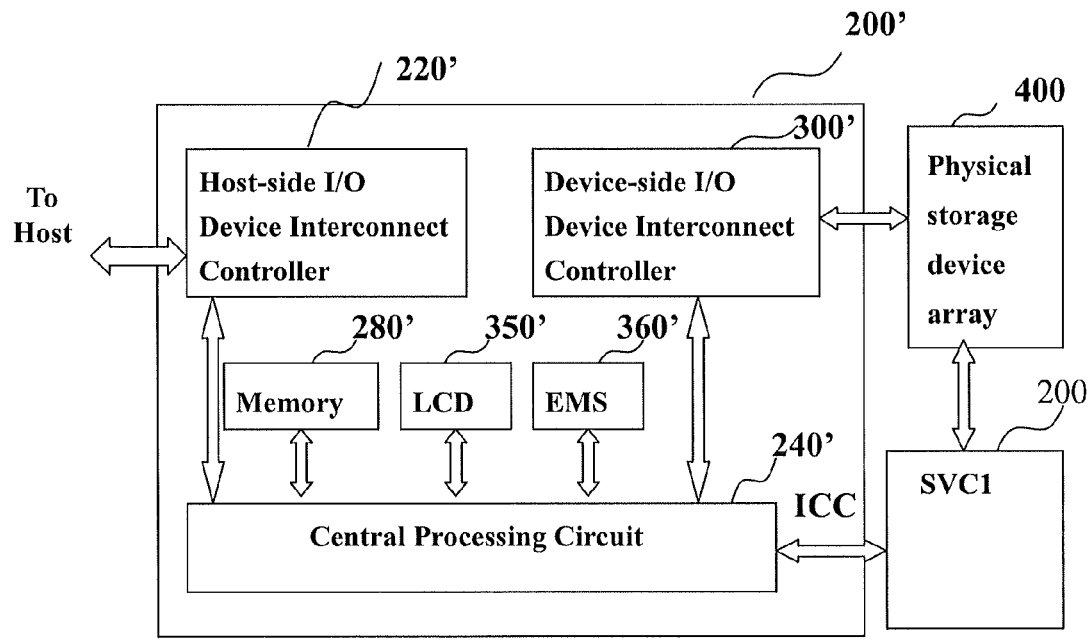
FIG. 3B is a block diagram of the second SVC according to the present invention.

FIGS. 3A and 3B details an exemplary block diagrams of an exemplary redundant storage virtualization system in the invention, comprising the first storage virtualization controller 200, the second storage virtualization controller 200', and the physical storage device array 400. Hereinafter, although the first storage virtualization controller 200 is taken for an example, as a matter of fact, the second storage virtualization controller 200' can be implemented in the same manner. In such an embodiment, the first storage virtualization controller 200 comprises a host-side I/O device interconnect controller 220, central processing circuit (CPC) 240, memory 280 and device-side I/O device interconnect controller 300. Although separate functional blocks are described here, in practice, parts or all functional blocks may be integrated as a single chip.

The host-side I/O device interconnect controller 220 is coupled to the host entity 10 and the central processing circuit 240 as an interface and a buffer between the SVC1 200 and the host entity 10, and receives I/O requests and associated data from host entity 10, and the I/O requests and associated data are then transferred and/or mapped to the central processing circuit 240. The host-side I/O device interconnect controller 220 may comprise one or more host-side port(s) coupled to host entity 10. Some common port types of the host-side ports that may be incorporated here are Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode. The device-side I/O device interconnect controller 300 between central processing circuit 240 and physical storage device array 400 is used as an interface and a buffer between the SVC1 200 and the physical storage device array 400. The device-side I/O device interconnect controller 300 receives I/O request and associated data from the central processing circuit 240, and subsequently maps and/or transfers them to the physical storage device array 400. The device-side I/O device interconnect controller 300 may comprise one or more device-side port(s) coupled to the physical storage device array 400. The device-side port may be FC-AL, SCSI, serial-attached SCSI (SAS), or serial advanced technology attachment (SATA).

Although in the above-mentioned embodiment, the host end and device end which are respectively provided with the host-side I/O device interconnect controller 220 and the device-side I/O device interconnect controller 300 are taken for example, in another embodiment of the present invention, there can be only one I/O device interconnect controller, so that the host-side port(s) and device-side port(s), which are coupled to the host entity 10 and the physical storage device array 400 respectively, are provided in the aforesaid I/O device interconnect controller.

When the central processing circuit 240 receives the I/O request of the host entity 10 from the host-side I/O device interconnect controller 220, the central processing circuit 240 parses it and performs certain operations in response to the I/O request and transmits the requested data and/or reports and/or information from the first storage virtualization controller 200 back to the host entity 10 through the host-side I/O device interconnect controller 220. After parsing the I/O request from host entity 10, if the I/O request is a read request, and one or more corresponding operations are performed, the central processing circuit 240 obtains the requested data either internally or from the memory 280, or in both ways, and then transmits them to the host entity 10. If the data requested by the read request neither is available internally nor exists in memory 280, I/O operations associated with the read request are transmitted to the physical storage device array 400 through the device-side I/O device interconnect controller 300. The requested data requested by the read request will then be transferred from the PSD array 400 to the memory 280, and passed to the host entity 10 through the host-side I/O device interconnect controller 220. If the I/O request from the host entity 10 is a write request and is transmitted to the central processing circuit 240, after the write request is parsed, and one or more corresponding operations are performed, the central processing circuit 240 receives the corresponding data from the host entity 10 via the host-side I/O device interconnect controller 220 and stores the corresponding data in the memory 280. For both the synchronous and asynchronous device operations, the data will be transmitted to the physical storage device array 400 via the central processing circuit 240. When the write request is a write back request, an I/O complete report can be issued to the host entity 10 first, and then the central processing circuit 240 performs actual write operations later. When the write request is a write through request, the I/O complete report is issued to the host entity 10 after the data is actually written into the physical storage device array 400. The memory 280 is coupled to the central processing circuit 240 to acts as a buffer to buffer the data transmitted between the host entity 10 and the physical storage device array 400 through the central processing circuit 240. In practice, the memory 280 can be dynamic random access memory (DRAM), particularly, the DRAM can be synchronous dynamic random access memory, SDRAM.

In the embodiment, the central processing circuit 240 in the first storage virtualization controller (SVC1) 200 is directly coupled to a central processing circuit (not shown) in the second storage virtualization controller (SVC2) 200', to establish an inter-controller communication channel (ICC) between the SVC1 200 and the SVC2 200'.

The device-side I/O device interconnect controller 300 is coupled to the physical storage device array 400, while the physical storage device array 400 is also coupled to the second storage virtualization controller (SVC2) 200'.

Under such an architecture, the second storage virtualization controller (SVC2) 200' may be coupled to the first storage virtualization controller (SVC1) 200, and the physical storage device array 400 may be accessible by both SVCs. Furthermore, a control/data signal from the host entity 10 can be transmitted from the central processing circuit 240 to the second storage virtualization controller (SVC2) 200', and further to a second physical storage device array (not shown).

Referring to FIG. 3A, according to the present embodiment, an enclosure management service circuitry (EMS circuitry) 360 can be attached to the central processing circuit 240 as a management circuitry of an enclosure for containing the physical storage device array 400. The EMS circuitry 360 controls power supply and performs some other management functionalities to the physical storage device array 400. Liquid crystal display (LCD) module 350 is also coupled to the central processing circuit 240 to display operation status of the subsystem. Whether the LCD module 350 or the EMS circuitry 360 is omitted from the redundant storage virtualization subsystem 20 or is integrated into the central processing circuit 240 depends on configurations of different product designs.

Figure 4A:
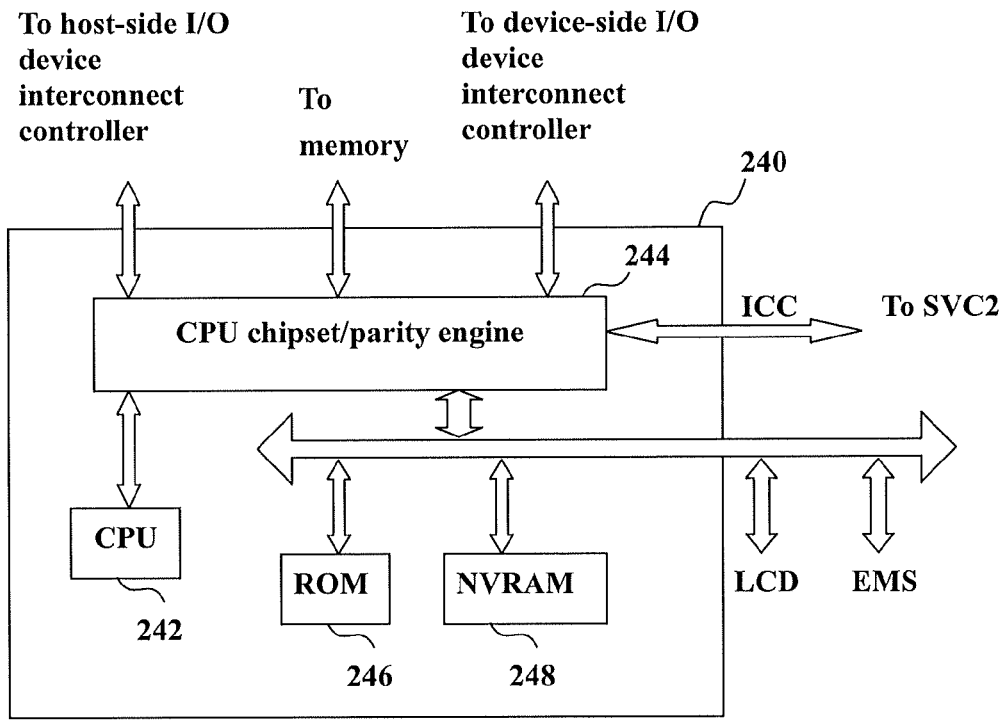
FIG. 4A is a block diagram of an exemplary central processing circuit of the first SVC in FIG. 3A.

FIG. 4A is a block diagram of an exemplary central processing circuit 240, comprising CPU chipset/parity engine 244, CPU 242, read only memory (ROM) 246, and non-volatile random access memory (NVRAM) 248. The CPU 242 may be a power PC CPU, the ROM 246 may be a flash memory for storing basic I/O system (BIOS) or other system programs performing operations to control redundant storage virtualization subsystem 20 when switched on. The NVRAM 248 stores information associated with I/O operation status of the physical storage device array 400, in which the information associated with I/O operation status can be examined after an abnormal power shutdown occurs when the I/O operation does not complete. The ROM 246, NVRAM 248, LCD module 350 and EMS circuitry 360 are coupled to the CPU chipset/parity engine 244 via an X-bus. The NVRAM 248 is optional and may be omitted in some embodiments of the present invention. Although the CPU chipset/parity engine 244 is described in an integration manner, in practice, both of the CPU chipset and parity engine may be on different chips.

Referring to FIG. 4A, the CPU 242 is coupled to other electronic components (such as memory 280) through the CPU chipset/parity engine 244.

Figure 5A:
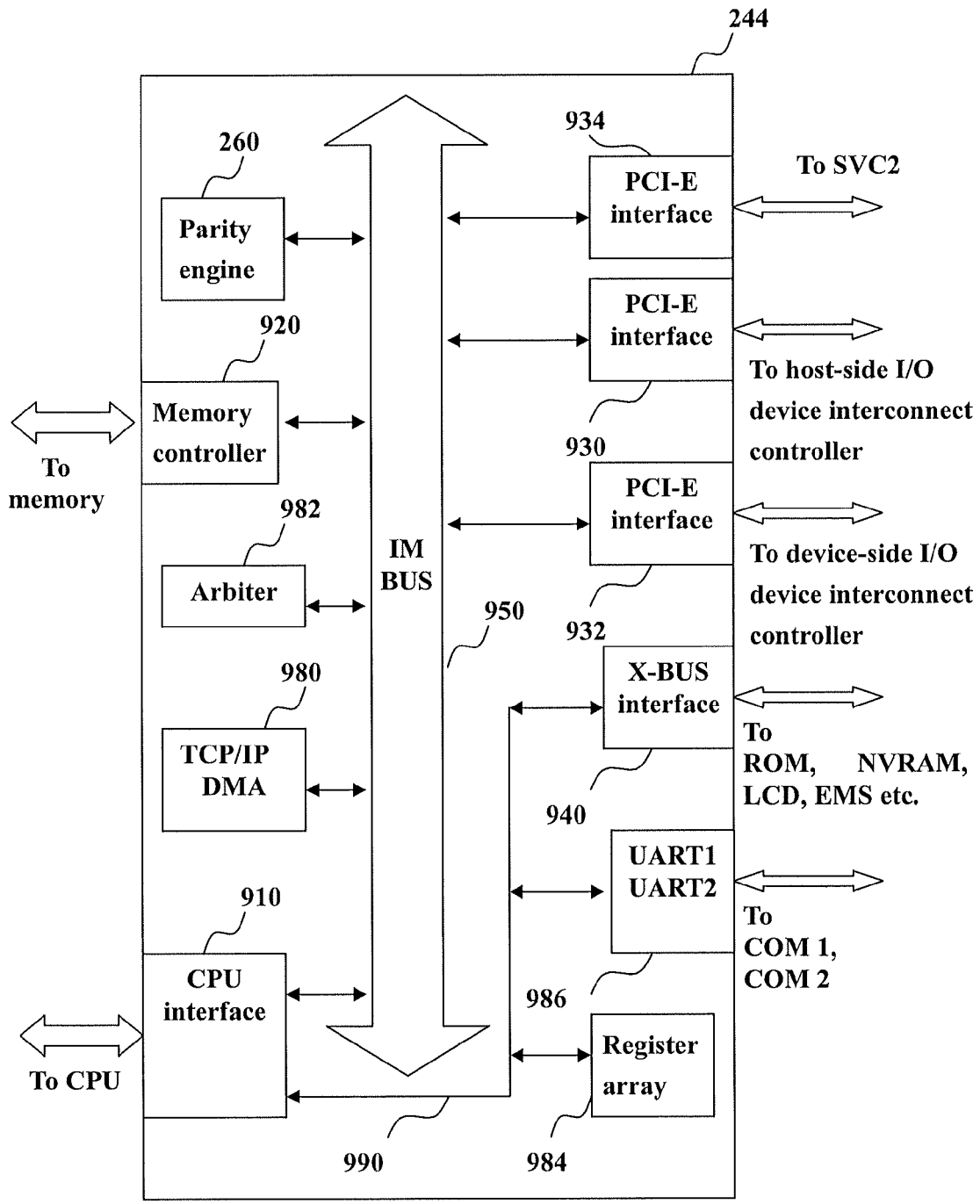
FIG. 5A shows a block diagram of an exemplary CPU chipset/parity engine of the first SVC in FIG. 4A.

FIG. 5A shows a block diagram of an exemplary CPU chipset/parity engine 244. The CPU chipset/parity engine 244 comprises parity engine 260, CPU interface 910, memory controller 920, PCI-Express interfaces 930, 932, and 934, X-Bus interface 940, transmission control protocol/internet protocol (TCP/IP) direct memory access (DMA) 980, arbiter 982, internal local (IL) bus 990 and internal main (IM) bus 950, wherein the IM bus 950 is coupled to the parity engine 260, the CPU interface 910, the memory controller 920, the PCI-Express interface 930, 932, and 934, and communicates data signals and control signals therebetween.

The data signals and control signals from the host-side I/O device interconnect controller 220 are transmitted to the CPU chipset/parity engine 244 via the PCI-Express interface 930, and the transmission rate thereof may be, for example, 1.5 Gbit/sec. When the PCI-Express interface 930 has the ownership of the IM bus 950, the data signals and control signals are forwarded to the memory controller 920 or the CPU interface 910.

When the CPU interface 910 receives the data signals and control signals from the IM bus 950, the CPU interface 910 transmits them to the CPU 242 for further proceeding. The communication between CPU interface 910 and CPU 242 may be, for example, implemented by 64 bit data lines and 32-bit address lines.

An error correction code (ECC) circuit (not shown) in memory controller 920 produces an ECC code by, e.g., XOR-ing 8-bits of data to generate 1-bit ECC code. Next, the memory controller 920 stores the data and ECC code into the memory 280. The memory 280 may be, for example, an SDRAM. The data in the memory 280 may be transmitted to the IM bus 950, and the memory controller 920 may be implemented such that when the data is transmitted from the memory 280 to the IM bus 950, the memory controller 920 performs functions, such as 1-bit auto-correction and multi-bit error detecting of the data.

The parity engine 260 can perform parity functionality of a certain RAID level in response to the instruction from the CPU 242. Under certain conditions, such as RAID level 0 case, the parity engine 260 may be shut off without performing parity functionality at all.

The IL bus 990 is coupled to the CPU interface 910 and to other low speed device interfaces.

The register array 984 is provided for registering status of the CPU chipset/parity engine 244, and for controlling the transmission on the IM bus 950. In addition, a pair of universal asynchronous receiver and transmitter (UART) functionality blocks 986 are used an external interface of the CPU chipset/parity engine 244, in which the external interface can be RS232.

The CPU chipset/parity engine 244 is coupled to the device-side I/O device interconnect controller 300 through the PCI-Express interface 932.

The TCP/IP DMA 980 performs checksum calculation and DMA operations. Arbiter 982 arbitrates ownership of the IM bus 950.

In the embodiment, for the data to be transmitted from the memory 280 to the second storage virtualization controller (SVC2) 200', the data enters the PCI-Express interface 934 via the IM bus 950, follows a PCI-Express communication channel, such as cable or backplane, and then directly arrives the PCI-Express interface 934' in the second storage virtualization controller 200' without requiring any third party, like an intermediate conversion buffer interface such as an RCC interconnect controller in the prior art.

In practice, the PCI-Express interface 930 and 932 may be substituted by PCI-X interfaces or PCI interfaces.

Figure 4B:
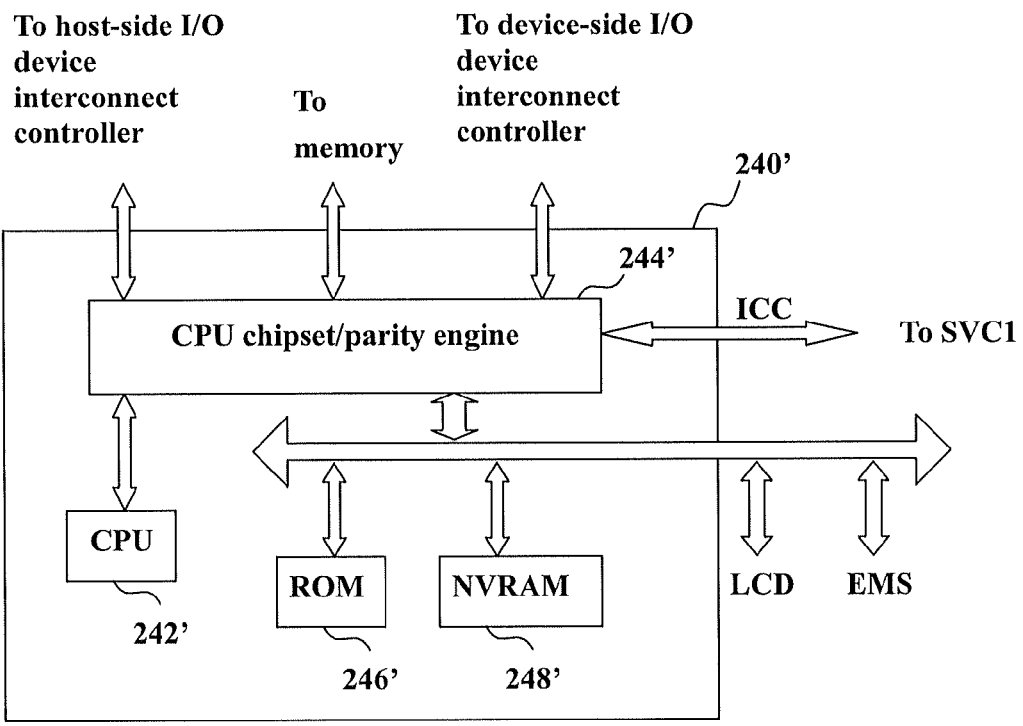
FIG. 4B is a block diagram of an exemplary central processing circuit of the second SVC in FIG. 3B.
Figure 5B:
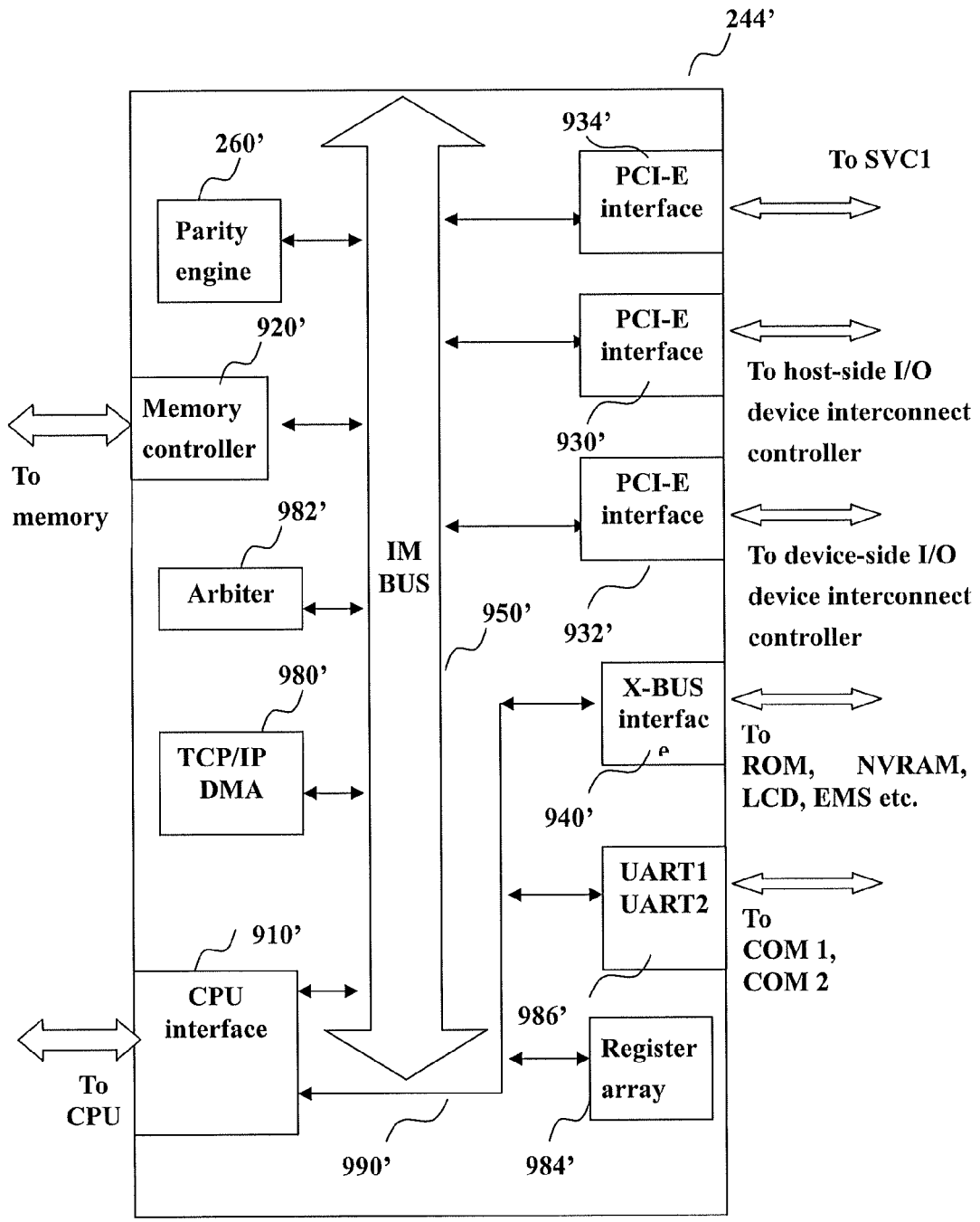
FIG. 5B shows a block diagram of an exemplary CPU chipset/parity engine of the second SVC in FIG. 4B.

Moreover, please refer to FIG. 3B, FIG. 4B and FIG. 5B, all of which show all elements of the second storage virtualization controller (SVC2) 200', in which the elements, like second memory 280', PCI-Express interface 934' and so on, of the second storage virtualization controller (SVC2) 200' are the same as those of the first storage virtualization controller (SVC1) 200. However, the functions of the elements of the second storage virtualization controller (SVC2) 200' remain the same as those of the elements of the first storage virtualization controller (SVC1) 200; therefore, the detailed descriptions of the second storage virtualization controller (SVC2) 200' are omitted herein.

In practice, after the SVC1 200 and SVC2 200' are switched on, the SVC1 200 and SVC2 200' must transmit data, especially, controller data, to each other in order to understood statuses of each other. So-called control data can be divided into the following types.

1. The first type control data—to inform the other end that the memory of receiving end is ready for receiving data from the other end.
2. The second type control data—to inform the other end that the control data, like complete signal, regarding transmitted data sent from the other end has been received by the receiving end.
3. The third type control data—to inform the other end whether itself still works normally. For example, a signal, such as, heart beat monitoring signal, is periodically transmitted to the other end every 0.02 second. Once the signal transmitted from the other end is not received, it is determined that the other end has failed, and the surviving end takes over the failing end.

Therefore, according to the first embodiment of the present invention, when the first computer system transmits data to the second computer system, the method for transmitting data between the two computer systems comprises the step of: transmitting, by the second computer system, a message to the first computer system via the second bus interface through the inter-controller communication channel (ICC), where the message comprises a destination address of a block of the second memory, and the block of the second memory is accessible by input/out (IO) operation; reading, by the first computer system, data in the first memory to be transmitted, after the first computer system receives the message; transmitting, by the first computer system, the data to be transmitted and the destination address, to the second computer system via the first bus interface through the ICC; and storing, by the second computer system, the transmitted data into the second memory according to the destination address. In addition, in actual application, the first computer system and the second computer system can be the first SVC 200 and the second SVC 200', respectively, and the data to be transmitted can be control data, and the first bus interface and the second bus interface can be the first PCI-Express interface 934 and the second PCI-Express 934', respectively for communicating with each other. There is the ICC between the first PCI-Express interface 934 and the second PCI-Express 934'.

Please refer to FIG. 6 which shows a flowchart of a method for data transmission according to the first embodiment of the present invention, in which when the first computer system and the second computer system are the first SVC 200 and the second SVC 200', the method for data transmission comprises the step of: transmitting, by the second SVC, at least one message to the first SVC 200, where the message comprises a destination address of a block of the second memory, and the block of the second memory is accessible by IO operation (S502); reading, by the first SVC 200, data in the first memory 280 to be transmitted after the first SVC 200 receives the message (S504); transmitting, by the first SVC 200, the data to be transmitted and the destination address, to the second SVC 200' (S506); and storing, by the second SVC 200', the transmitted data into the second memory 280' according to the destination address (S508).

Figure 6A:
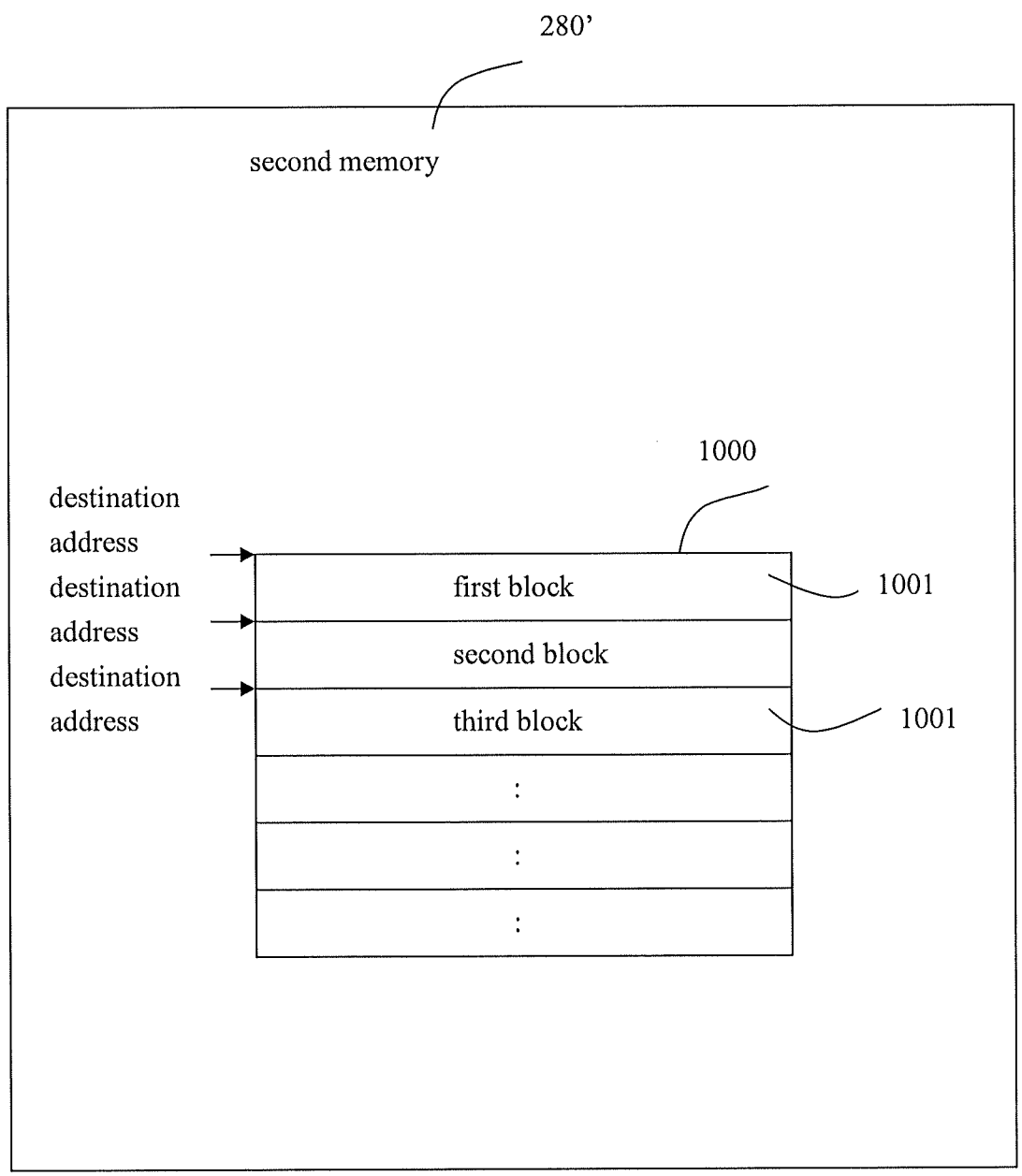
FIG. 6A shows a format of the second memory of the second SVC according to the first embodiment the present invention.

Please refer to FIG. 6A which shows a format of the second memory 280', so as to explain S502 step of FIG. 6. As shown TD—1b indicates presence of TLP digest in the form of a single DW at the end of the TLP (see Section 2.2.3)—bit 7 of byte 2

EP—indicates the TLP is poisoned (see Section 2.7)—bit 6 of byte 2

Length[9:0]—Length of data payload in DW (see Table 2-4)—bits 1:0 of byte 2 concatenated with bits 7:3 of byte 3

TLP data must be 4-byte naturally aligned and in increments of 4-byte Double Words (DW).

Reserved for TLPs that do not contain or refer to data payloads, including Cp1, Cp1Lk, and Messages (except as specified)

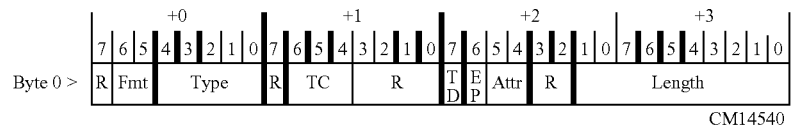

Figure 6B:
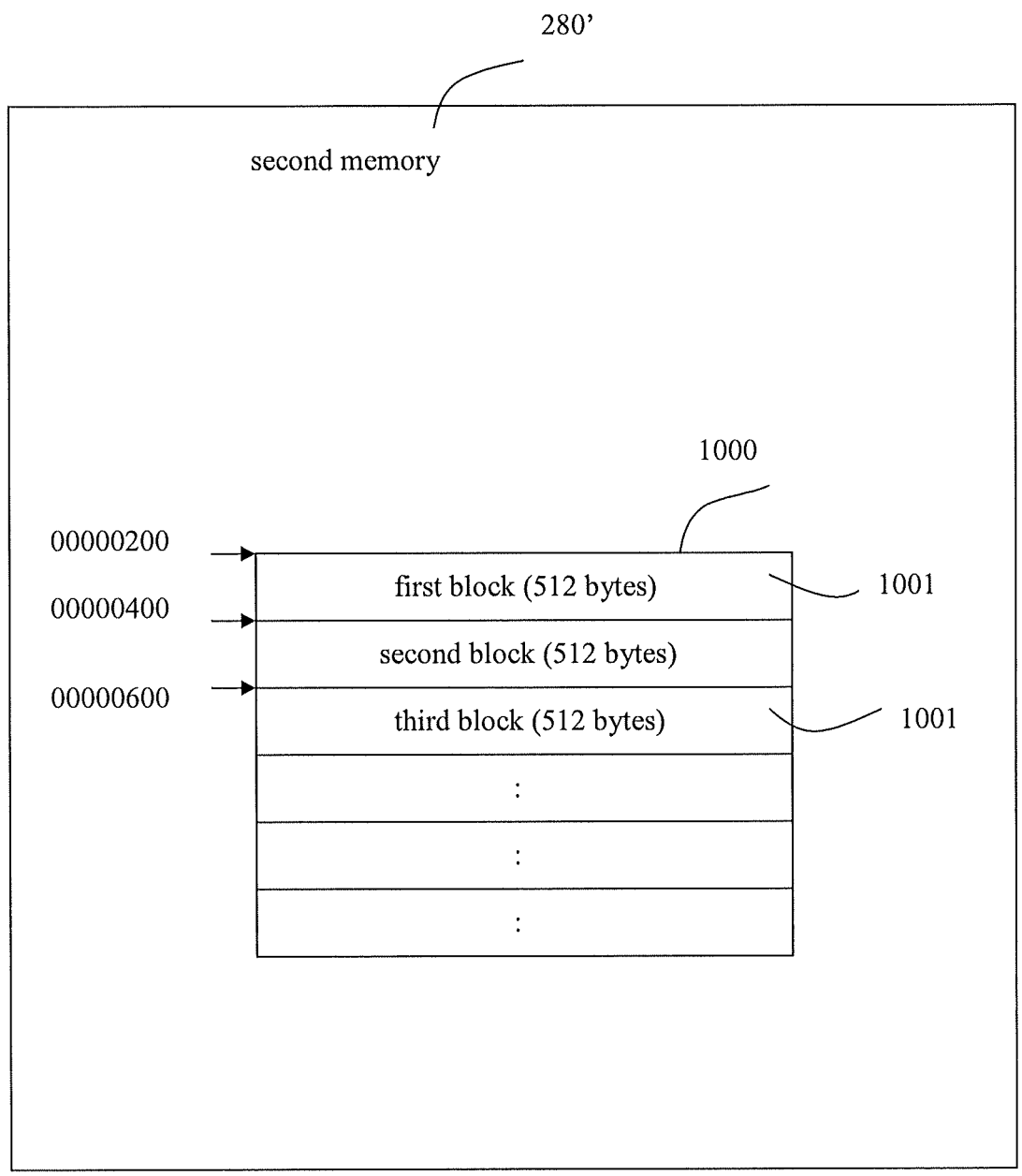
FIG. 6B shows an implementation of the second memory of the second SVC according to the first embodiment of the present invention.
Figure 8A:
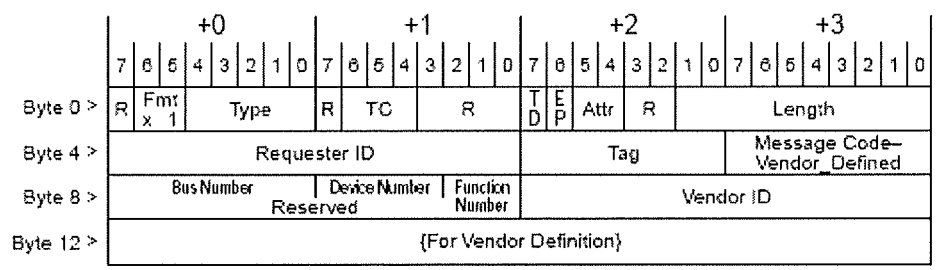
FIG. 8A is a header of the vendor-defined message that is defined by PCI-Express.

CM14540 in FIG. 6A, content of the second memory 280' comprises a data transmission table 1000 that comprises a plurality of blocks 1001. When the SVS is configured, each of the plurality of blocks 1001 is configured to have itself capacity and destination address. For example, as shown in FIG. 6B, when the SVS is configured, each of the plurality of blocks 1001 is configured to have 512 bytes, where destination address of the first block is 00000200, destination address of the second block is 00000400, and destination address of the third block is 00000600, and the like. After data stored in the first block (destination address=00000200) of the second memory 280' is read, that means that the first block can be overwritten with data, and the PCI-Express interface 934' of the second SVC 200' transmits the destination address (destination address=0000200) of the first block via a message to the first SVC 200 through the ICC, where the message comprises the destination address (destination address=00000200) of the first block. Next, after data stored in the second block (destination address=00000400) of the second memory 280' is read, in other words, the second block can be overwritten with data, and the PCI-Express interface 934' transmits the destination address (destination address=00000400) via another message to the first SVC 200 through the ICC, where the another message comprises the destination address (destination address=00000400) of the second block. Again, after data stored in the third block (destination address=00000600) is read, the second block can be overwritten with data, and the PCI-Express interface 934' of the second SVC 200' transmits the destination address (destination address=00000600) via another message to the first SVC 200 through the ICC, where the another message comprises the destination address (destination address=00000600) of the third block, and the like, where these messages can be vendor-defined message or ignore message, both of which are defined by PCI-Express protocol. However, the present invention takes the vendor-defined message for example, but is not limited thereto. FIG. 8A shows entire header of the vendor-defined message, each fields of which is briefly explained as follows:

Permitted Fmt[1:0] and Type[4:0] field values are shown its Table 2-3.

All other encodings are reserved.

TC[2:0]—Traffic Class (see Section 2.4.2)—bits [6:4] of byte 1

Attr[1:0]—Attributes (see Section 2.2.6.3)—bits [5:4] of byte 2

TABLE 2-3

Fmt[1:0] and Type[4:0] Field Encodings

Figure 8C:
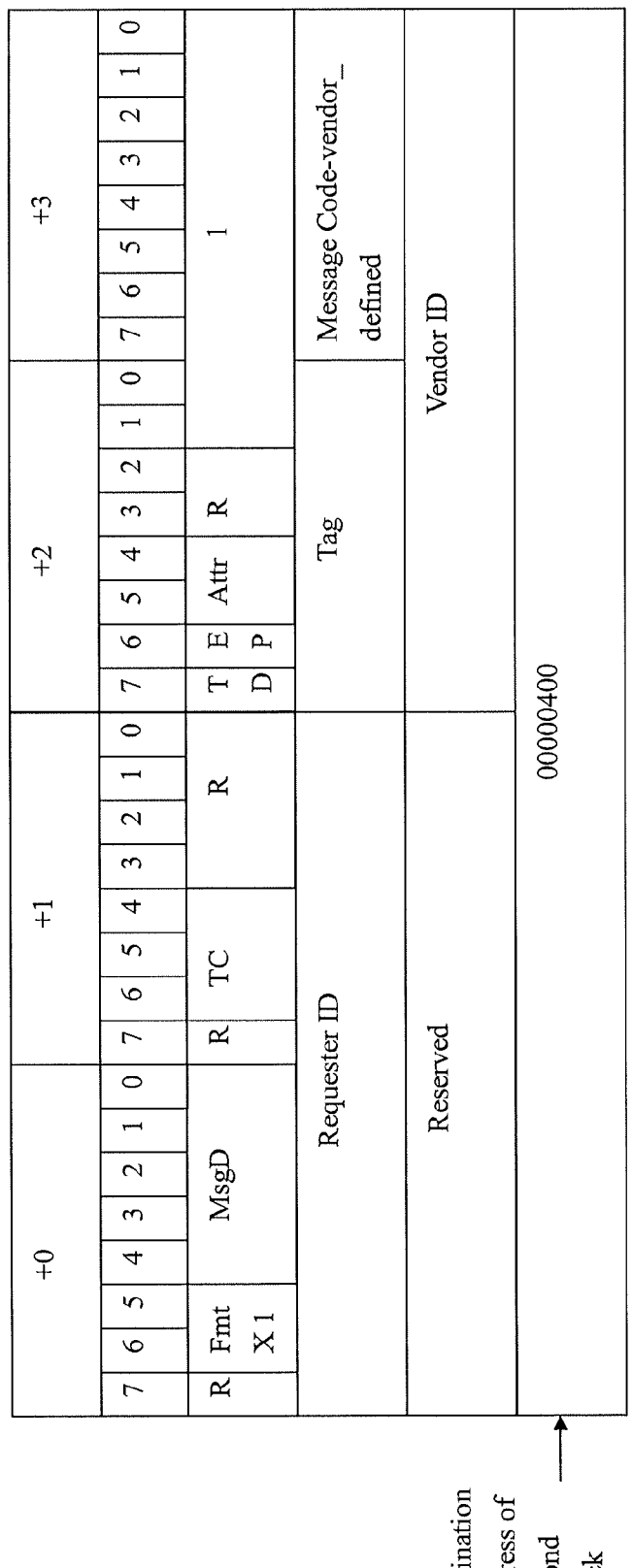

| TLP Type | Fmt [1:0][2] | Type [4:0] | Description |
|---|---|---|---|
| MRd | 00 01 | 0 0000 | Memory Read Request |
| MRdLk | 00 01 | 0 0001 | Memory Read Request-Locked |
| MWr | 10 11 | 0 0000 | Memory Write Request |
| IORd | 00 | 0 0010 | I/O Read Request |
| IOWr | 10 | 0 0010 | I/O Write Request |
| CfgRd0 | 00 | 0 0100 | Configuration Read Type 0 |
| CfgWr0 | 10 | 0 0100 | Configuration Write Type 0 |
| CfgRd1 | 00 | 0 0101 | Configuration Read Type 1 |
| CfgWr1 | 10 | 0 0101 | Configuration Write Type 1 |
| Msg | 01 | 1 0$r_2r_1r_0$ | Message Request - The sub-field r[2:0] specifies the Message routing mechanism (see Table 2-11). |
| MsgD | 11 | 1 0$r_2r_1r_0$ | Message Request with data payload - The sub-field r[2:0] specifies the Message routing mechanism (see Table 2-11). |
| Cpl | 00 | 0 1010 | Completion without Data - Used for I/O and Configuration Write Completions and Read Completions (I/O, Configuration, or Memory) with Completion Status other than Successful Completion. |
| CplD | 10 | 0 1010 | Completion with Data - Used for Memory, I/O, and Configuration Read Completions. |
| CplLk | 00 | 0 1011 | Completion for Locked Memory Read without Data - Used only in error case. |
| CplDLk | 10 | 0 1011 | Completion for Locked Memory Read - otherwise like CplD. All encodings not shown above are Reserved. |

Wherein TLP means Transport Layer Packet
Requester ID for identifying which is the requester
Tag for tag number of such a tag
Message code-vendor defined for defining how receivers handle the received message Thereby, in actual application, when the first block of the data transmission table 1000 of the second SVC 200' is read, the second SVC 200' transmits the vendor-defined message comprising the destination address (destination address=00000200) of the first block, to the first SVC 200 as shown in FIG. 8B. When the second block of the data transmission table 1000 of the second SVC 200' in FIG. 6B is read, the second SVC 200' transmits the vendor-defined message comprising the destination address (destination address=00000400) of the second block, to the first SVC 200 as shown in FIG. 8C. When the third block of the data transmission table 1000 of the second SVC 200' in FIG. 6B is read, the second SVC 200' transmits the vendor-defined message comprising the destination address (destination address=00000600) of the third block, to the first SVC 200 as shown in FIG. 8D, and the like.

Figure 7A:
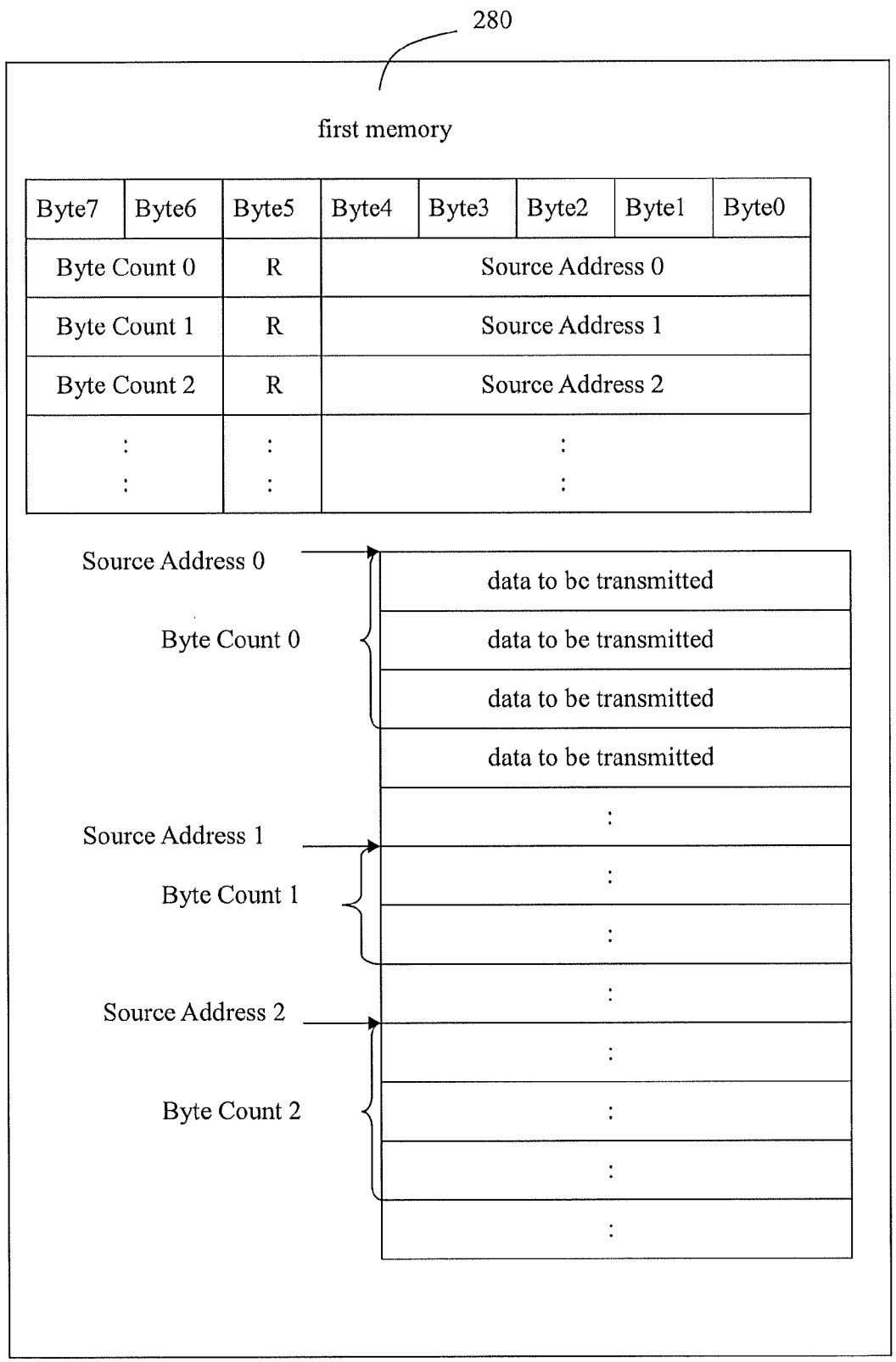
FIG. 7A shows a format of the first memory of the first SVC according to the first embodiment of the present invention.
Figure 7B:
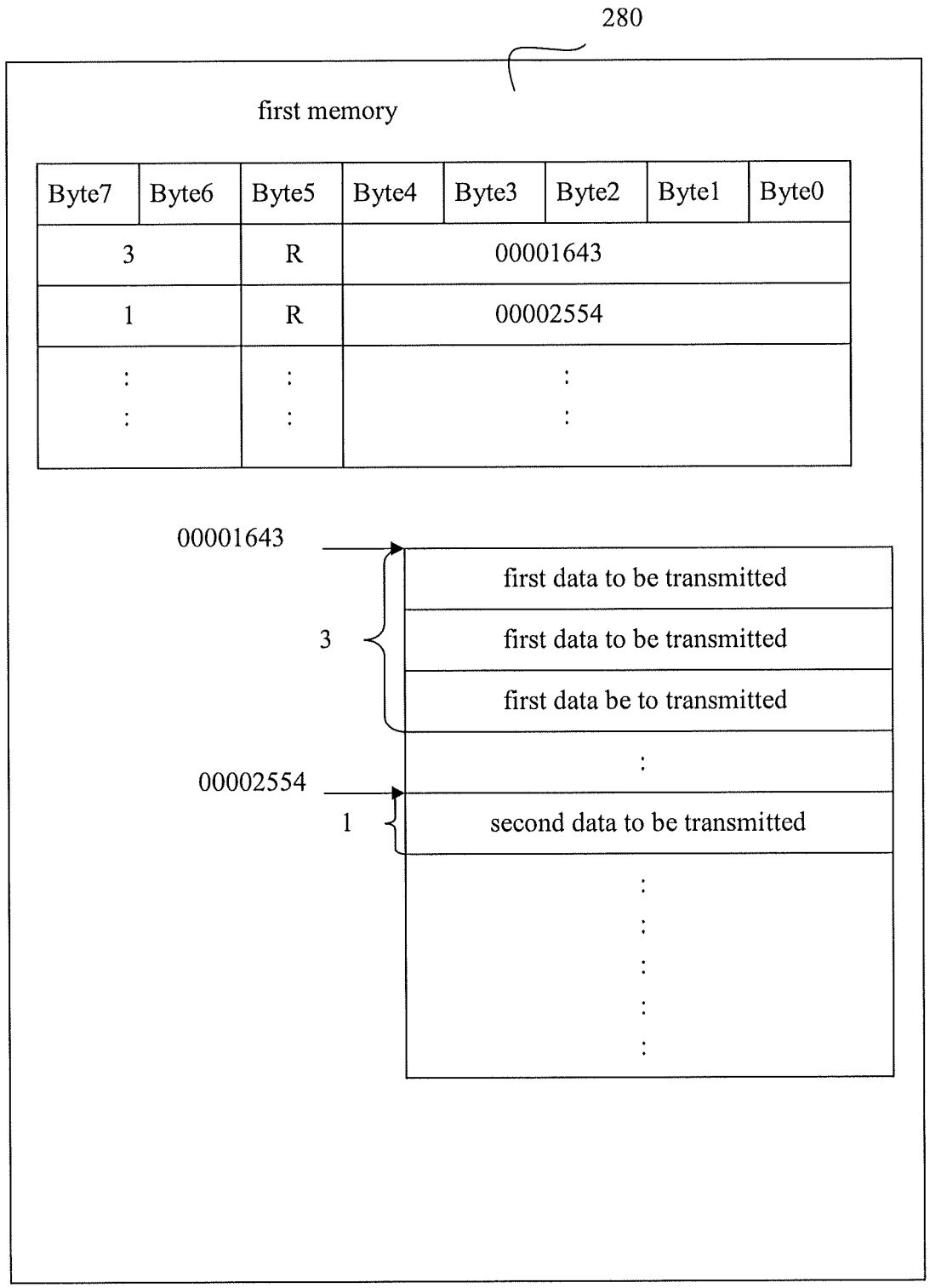
FIG. 7B shows an implementation of the first memory of the first SVC according to the first embodiment of the present invention.

Please refer to FIG. 7A which shows the content of the first memory 280 in order to explain the steps S504 of FIG. 6 of the present invention. As shown in FIG. 7A, the content of the first memory 280 comprises the data to be transmitted, such as control data, and its byte count and source address. The first SVC 200 reads the data to be transmitted according to the byte count and the source address. For example, as shown in FIG. 7B, when the first SVC 200 receives the vendor-defined message comprising the destination address (destination address=00000200) of the first block, the first SVC 200 can immediately determines, through the vendor-defined message comprising the destination address (destination address=00000200) of the first block, that the first block of the second memory 280' of the second SVC 200' can store not more than 512 byte but not less than 1 byte data, and the PCI-Express 934 of the first SVC 200 can first find, according to the byte count (byte count 0=3) and source address (source address 0=00001643), the source address 00001643 in the first memory 280, and read the first data to be transmitted of the below 3 byte counts according to the byte count that is equal to 3. Again, hereinafter, the second data to be transmitted is further taken for example. When the first SVC 200 receives the vendor-defined message comprising the destination address (destination address=00000400) from the second SVC 200', the first SVC 200 can immediately determine, through the vendor-defined message comprising the destination address (destination address=00000400) of the second block, that the second block of the memory 280' of the second SVC 200' can store not more than 512 bytes but not less than 1 byte data. The PCI-Express interface 934 of the first SVC 200 find, according to the byte count (byte count 1=1) and source address (source address 1=00002554), the source address 00002554 in the first memory 280, and read the second data to be transmitted of the below 1 byte count according to the byte count that is equal to 1, and the like, so that in FIG. 6, the step S504 of reading the data to be transmitted can be achieved.

In step S506 of FIG. 6, when the first SVC 200 can determine, through the vendor-defined message comprising the destination address (destination address=00000200) of the first block, that the first block of the second memory 280' of the second SVC 200' can store not more than 512 bytes but not less than 1 byte data, the first SVC 200 transmits the first data to be transmitted and the destination address (destination address=00000200) of the first block of the second memory 280', to the second SVC 200'. After the second SVC 200' receives the transmitted first data and the destination address (destination address=00000200) of the first block, the second SVC 200' stores, according to the destination address (destination address 00000200) of the first block, the transmitted first data into the first block of the data transmission table 1000 of the second memory 280'. Again, the first SVC 200 can determine, through the vendor-defined message comprising the destination address (destination address=00000400) of the second block of the second memory 280', that the second block of the second memory 280' of the second SVC 200' can stores not more than 512 bytes but less than 1 byte data, and transmits the second data to be transmitted and the destination address (destination address=00000400), to the second SVC 200'. After the second SVC 200' receives the transmitted second data and the destination address (destination address=00000400) of the second block, the second SVC 200' stores, according to the destination address (destination address=00000400) of the second block into the second memory 280', the transmitted second data into the second block of the data transmission table 1000 of the second memory 280' and the like, so that in FIG. 6, the step S508 of storing the transmitted data can be achieved.

It should be noted that although in the above-mentioned embodiment, it is taken for an example that the first SVC 200 transmits the data to be transmitted to the second SVC 200', in actual application, the first SVC 200 and the second SVC 200' can transmits data be to transmitted to each other in order to further understand each other's statuses.

The advantages of above-mentioned method are that once one of the blocks of the second memory 280' of the second SVC 200' is released, the second SVC 200' immediately transmits the message comprising the destination address of the released block, to the first SVC 200, so that the first SVC 200 can immediately determine, through receiving the message comprising the destination address of the released block, that the second memory 280' of the second SVC 200' has the block that is accessible, and transmits the data to be transmitted and the destination address, to the second memory 280'. If so, overflow of the second memory 280' of the second SVC 200', which is caused by the fact that the first SVC 200 keeps transmitting data to the second memory 280' of the second SVC 200', will not happen.

However, according to the second embodiment of the present invention, when the first computer system transmits the data to be transmitted to the second computer system, the present invention provides another method for transmitting data between the two computer systems, in which the method comprises the steps of: establishing, by the second computer system, a data transmission table in the second computer system; transmitting, by the second computer system, a message to the first computer system, where the message comprises base address, length, and block size of the data transmission table, so that the first computer system can sufficiently understand the base address, length, and block size of the data transmission table in the second memory of the second computer system, and transmits the data to be transmitted to the second computer system; recording a number of block, in which data have been read by the second computer system, as a number of credit, and transmitting the number of credit to the first computer system; transmitting, by the first computer system, the data to be transmitted to the second computer system according to the number of credit after the first computer system receives the number of credit; storing, by the second computer system, the transmitted data from the first computer system, into the data transmission table in the second memory of the second computer system, where the first computer system and the second computer system can be the first SVC 200 and the second SVC 200', respectively, and the data to be transmitted can be control data.

Please refer to FIG. 9 which shows a flowchart of a method for data transmission according to the second embodiment of the present invention, where the first computer system and the second computer system can be the first SVC 200 and the second SVC 200', respectively. The method comprises the step of: establishing, by the second SVC, a data transmission table in the memory of the second SVC 200'(S802); transmitting, by the second SVC 200', at least one message to the first SVC 200, where the message comprising the base address, length and block size of the data transmission table 1002

(S804); recording the number of block, in which data have been read by the second SVC, as the number of credit, and transmitting, by the second SVC 200', the number of credit to the first SVC 200 (S806); reading the data to be transmitted and transmitting, by the first SVC 200, the data to be transmitted to the second SVC 200' according to the number of credit after the first SVC 200 receives the number of credit (S808); storing, by the second SVC 200', the transmitted data from the first SVC 200, into the data transmission table 1002 in the second memory 280' of the second SVC 200'(S810).

Figure 10A:
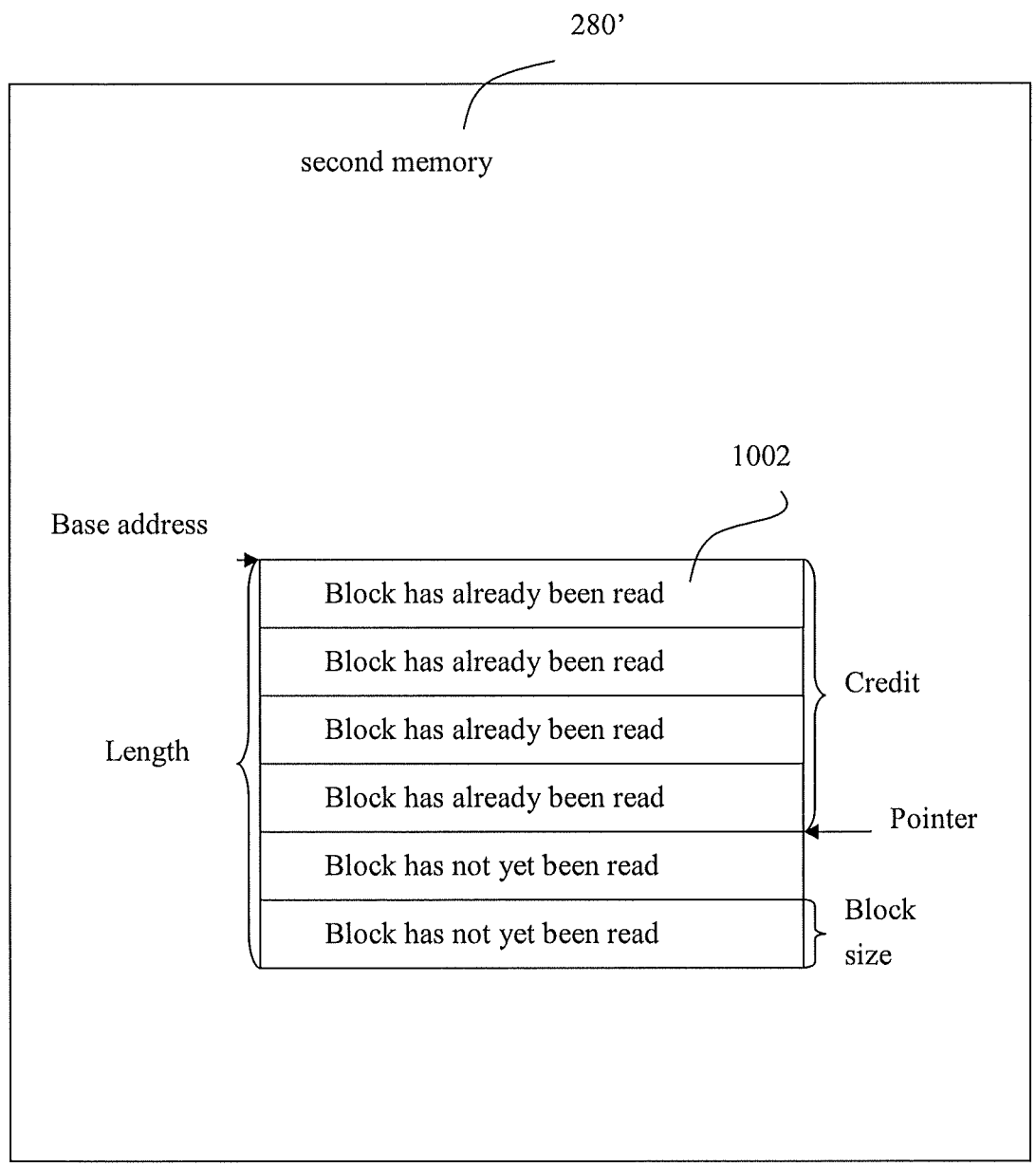
FIG. 10A shows a format of the second memory of the second SVC according to the second embodiment of the present invention.
Figure 10B:
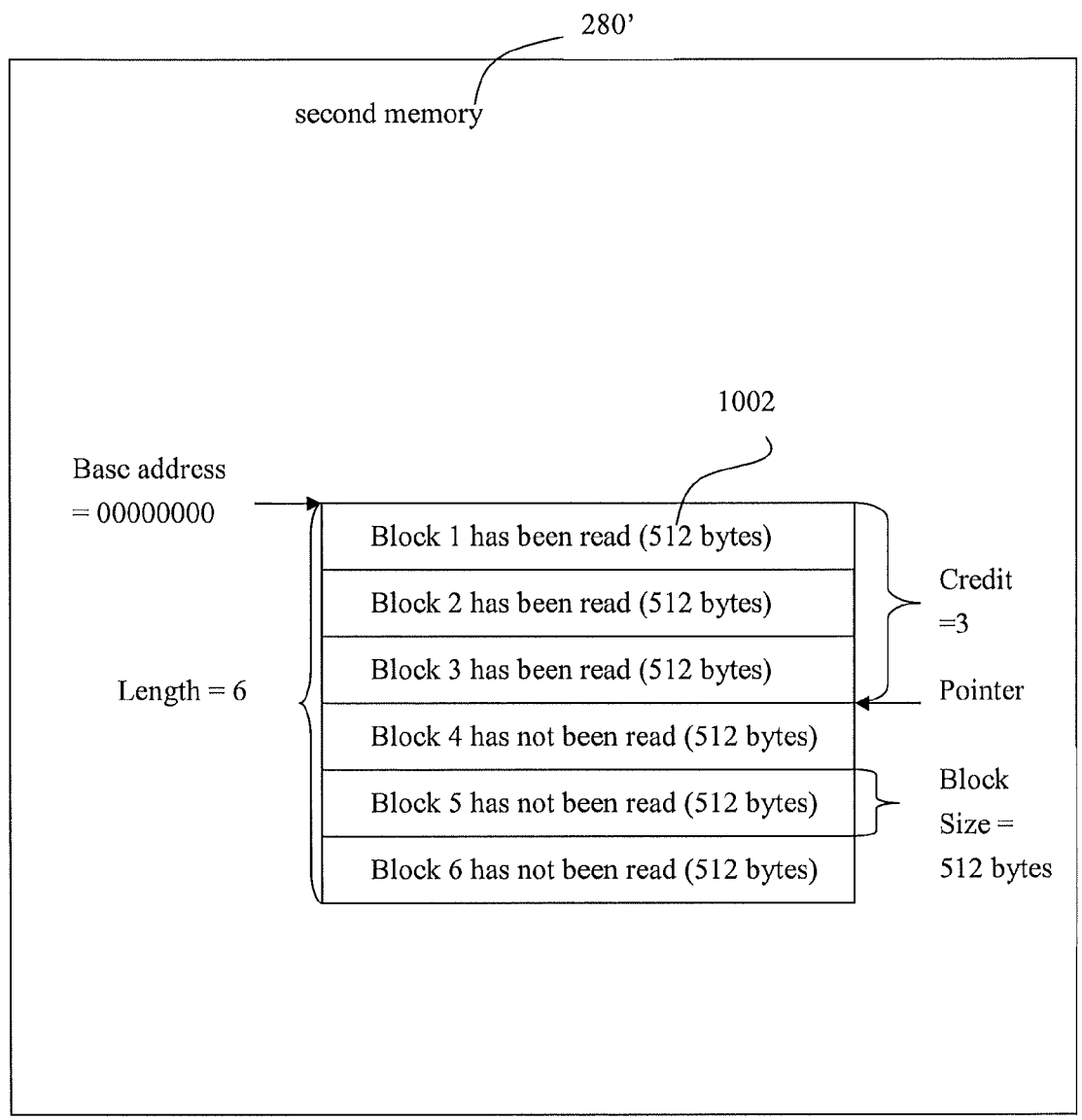
FIG. 10B shows an implementation of the second memory of the second SVC according to the second embodiment of the present invention.
Figure 10C:
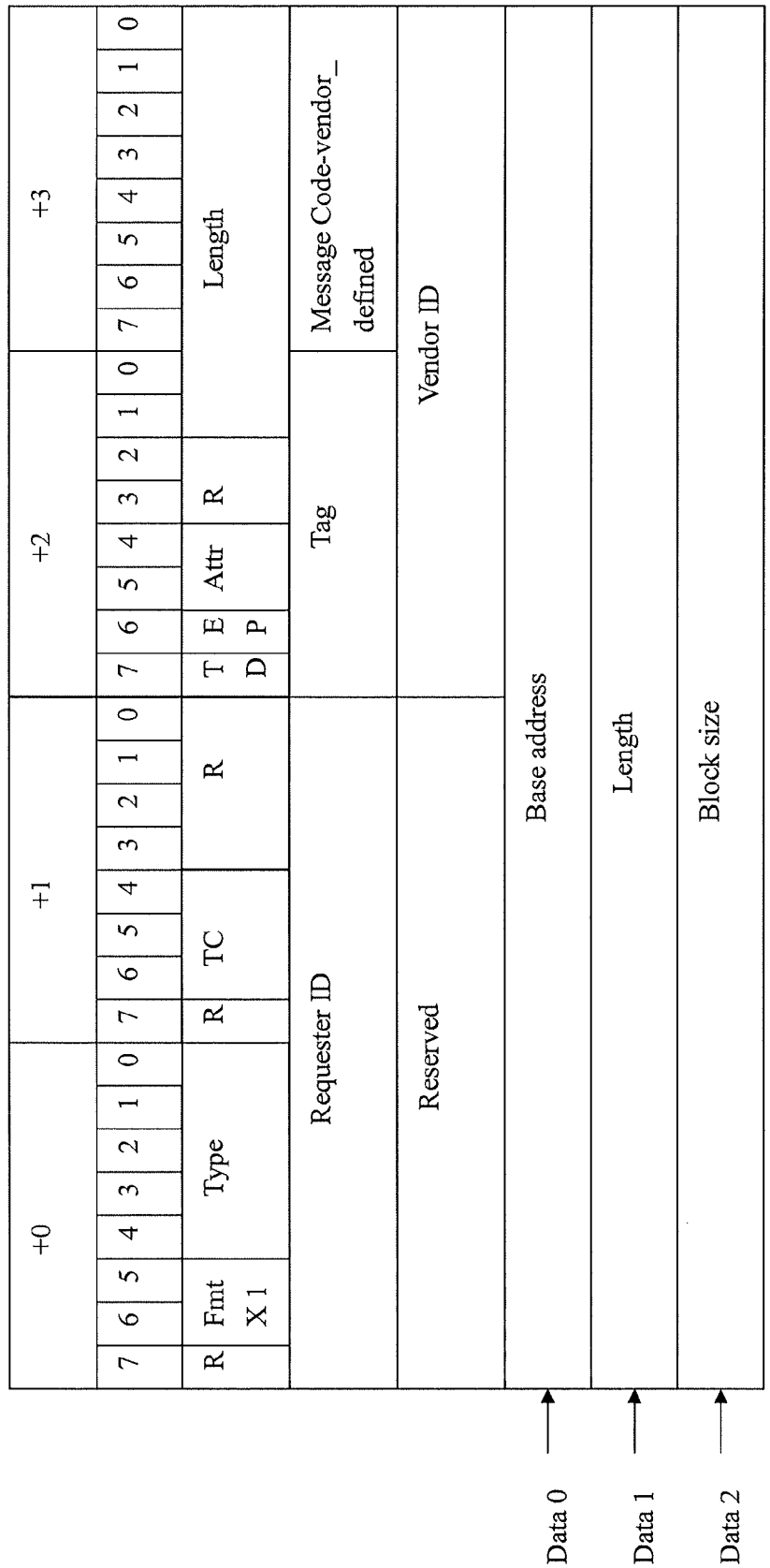

In S802 of FIG. 9, the second SVC 200' establishes the data transmission table 1002 in the memory 280' of the second SVC 200', where the data transmission table 1002 comprises a base address, length, block size, credit and pointer as shown in FIG. 10A. In the present embodiment, FIG. 10B shows the base address (base address=00000000), length (length=6), block size (block size=512 bytes). After the data transmission table 1002 is established, the second SVC 200' transmits the message comprising the base address (base address=00000000), length (length=6), block size (block size=512 bytes), to the first SVC 200 via the second PCI-Express interface 934' through the ICC, where the message can be the vendor-defined message or ignore message, as shown in FIG. 10C and FIG. 10D, both of which are defined by the PCI-Express protocol. However, hereinafter, the vendor-defined message is taken for example, but is not limited thereto. In FIG. 10C and FIG. 10D, the message comprises data regarding the data transmission table 1002, where the message comprises Data 0 (base address=00000000), Data 1 (length=6), Data 2 (block size=512 bytes). When the first SVC 200 receives such a message through its PCI-Express 934, the first SVC 200 can sufficiently understand format, capacity, position of the data transmission table in the second memory 280' of the second SVC 200' through content of the message as shown in FIG. 10B including the format, capacity, position of the data transmission table in the second memory 280' of the second SVC 200'. Then, the first SVC 200 can first transmit data to be transmitted, data amount of which is not more than 3072 bytes (length=6, block size=512 bytes, thus, 512 bytes*6=3072 bytes), into the data transmission table 1002 of the second SVC 200', and the second SVC 200' reads the data in the blocks of the data transmission table 1002 (S804 in FIG. 9).

In step S806 of FIG. 9, as shown in FIG. 10B, when the second SVC 200' has already read 3 blocks in the data transmission table 1002, i.e., 3 credits are released to the first SVC 200 for transmitting data, the pointer points to the next block where data have not been read yet, and the second SVC 200' transmits the vendor-defined message comprising 3 credits, to the first SVC 200. When the first SVC 200 receives the vendor-defined message comprising these 3 credits from the second SVC 200', the first SVC 200 immediately determines that the data stored in these 3 blocks of the data transmission table 1002 of the second memory 280' of the second SVC 200' have already been read, and that the data transmission table 1002 can store not more than 1536 bytes data (i.e., one block (credit)=512 bytes, in other words, 3 blocks (3 credits)=1536 bytes because the data stored in these 3 blocks of the data transmission table 1002 have already been read) transmitted from the first SVC 200. After the first PCI-Express interface 934 of the first SVC 200 receives the vendor-defined message comprising these 3 credits, the first SVC 200 immediately determines that the data to be transmitted to the second SVC 200' is not more than 1536 bytes and not less than 1 byte, and reads the data to be transmitted to the second SVC 200' according the byte count and source address shown and described in FIG. 7A and FIG. 7B, in order to read out the data to be transmitted, in which the read steps are omitted herein. The first SVC 200 transmits the data to be transmitted to the second SVC 200' via the PCI-Express interface 934 through the ICC (S808 in FIG. 9)

At last, in step S810 of FIG. 9, the second SVC 200' receives the transmitted data from the first SVC 200 and stores the transmitted data into the data transmission table 1002 of the second memory 280'. The advantages of the present invention are that through above-mentioned credit(s), when the data in one or more the block(s) (credit(s)) have already been read by the second SVC 200', the second SVC 200' informs the first SVC 200 of the credit(s), and the first SVC 200 transmits proper amount of data to be transmitted to the second SVC 200' according to the credit(s), so that overflow of the second memory 280' of the second SVC 200', which is caused by the fact that the first SVC 200 keeps transmitting data to be transmitted to the second SVC 200', will not happen.

Figure 10E:
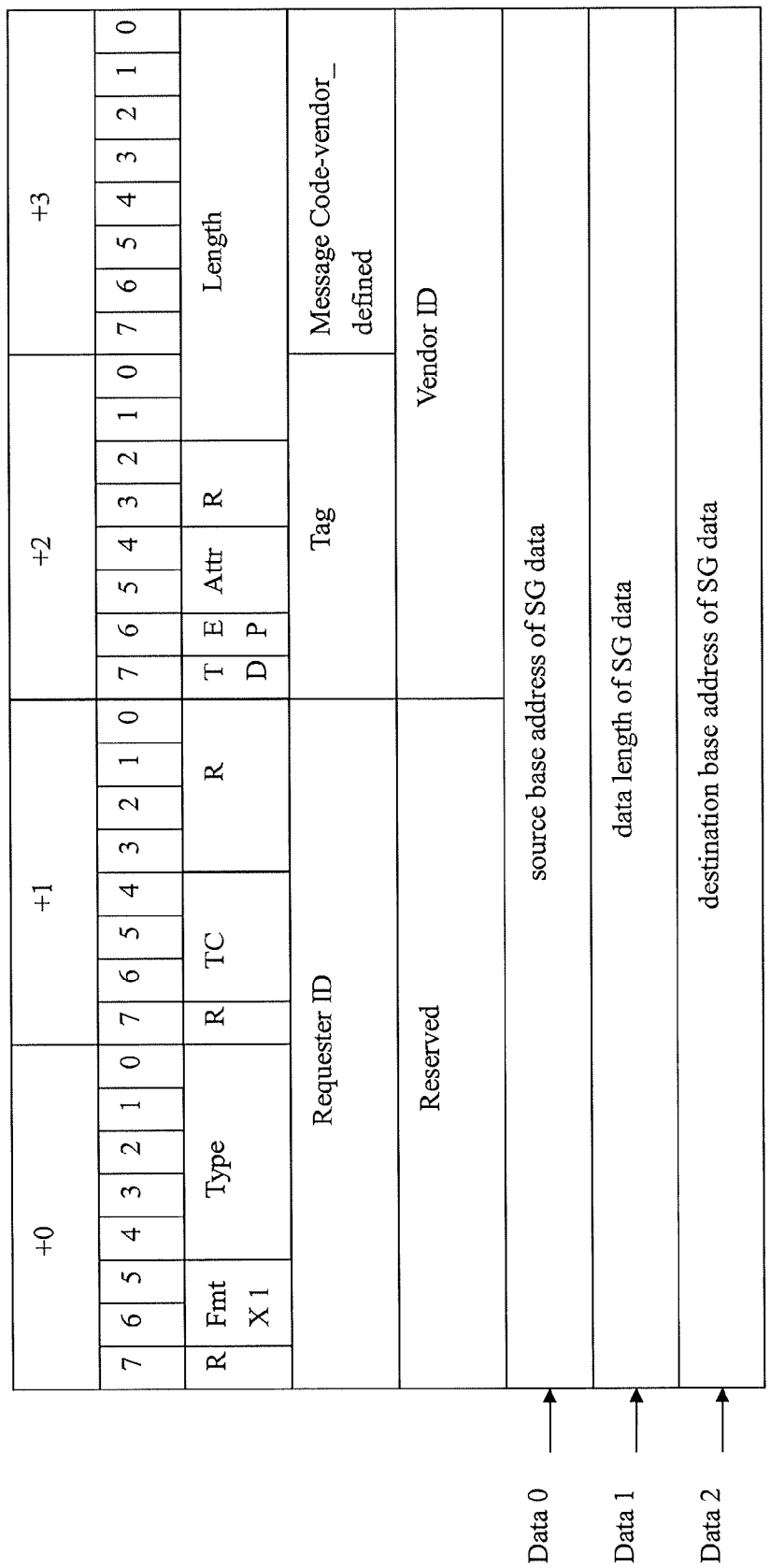

It should be noted that although in above-mentioned the first and the second embodiments, it is taken for example that the first SVC 200 transmits the data to be transmitted (control data) to the second SVC 200', in actual application, the first SVC 200 and the second SVC may transmit the data to each other in order to further understand each other's statuses. Although the above-mentioned embodiments of the present invention discloses the data transmission between the two SVCs, the purpose of which is to make the two SVCs further understand each other's statuses, the two SVCs can transmits scattered data through operations indicated by scatter-gathered data (SG data) of the scatter-gathered list (SG List). Please refer to FIG. 10E which shows a second application of the vendor-defined message, in which the FIG. 10E shows that when the first SVC 200 makes read request (data in) to the second SVC 200', the first SVC 200 transmits the vendor-defined message through the first PCI-Express 934, in which the vendor-defined message comprises the source base address of SG data, data length of SG data and optional destination base address of SG data. Furthermore, FIG. 10F is further taken for example, in which the vendor-defined message comprises source base address (source base address=00003200) of SG data, data length (data length=2) of SG data and destination base address (destination base address=D3000000) of SG data. When the first SVC 200 make read data request to the second SVC 200', the first SVC 200 transmits the vendor-defined message comprising the source base address (source base address=00003200) of SG data, the data length (data length=2) of SG data, and the destination base address (destination base address=D3000000) of SG data, to the second SVC 200', and the second SVC 200' receives the vendor-defined message comprising above-mentioned data of SG data through the second PCI-Express 934'. When the second SVC 200' receives the vendor-defined message comprising the source base address (source base address=00003200) of SG data, the data length (data length=2) of SG data, and the optional destination base address (destination base address=D3000000) of SG data, the second SVC 200' reads the SG data in the SG-List according the source base address (source base address=00003200), reads the next two SG data according the data length (data length=2), reads the scattered data according to these SG data, and transmits, through the second PCI-Express 934', the scattered data that are read out and destination base address (destination base address=D3000000) to the first SVC 200. When the first SVC 200 receives scattered data through the first PCI-Express 934, and stores the scattered data according to the destination base address (destination base address=D3000000).

The applicants of the present invention further explain how to transmit the scattered data between the two SVCs through the PCI-Express, the technology of which has already been disclosed in U.S. Ser. No. 11/330,961 that is incorporated herein for reference. To increase CPU efficiency of a storage virtualization controller, an embodiment of a method of data transmission is provided in the invention, as shown in FIG. 11.

In step S910, a CPU establishes, based on a predefined data-transfer-protocol format, a corresponding Scatter-Gather list (SG-List) of data to be transmitted to the second SVC.

In step S920, the CPU writes a message with address of the SG-List, to a register that belongs to the PCI-Express interface establishing the ICC.

In step S930, the PCI-Express interface reads the SG-List according to the address message, reads the to-be-transmitted scattered data in a memory according to the SG-list, and transmits the to-be-transmitted scattered data to the second SVC via the ICC.

The register that belongs to the PCI-Express interface may be in the PCI-Express interface or may be in a register functionality block, such as a register array.

When the CPU writes to the register, because the register belongs to the PCI-Express interface, the register transmits the address message to the PCI-Express interface establishing the ICC, and triggers the PCI-Express interface.

In an embodiment, some specific memory address in the register is reserved for the address of the SG-List, such that the CPU can write the address of SG-List, in which the write is a trigger signal, so that the register will trigger an engine in the PCI-Express interface to perform data transmission procedure. In this way, the CPU only needs to write the memory address of the SG-List to the specific address of the register.

FIG. 12 shows an exemplary SG-List of the present invention, comprising a list entry count field for indicating a count of SG data in the SG-List; a source base address field for indicating memory start address for each to-be-transmitted scattered data; a data length field for indicating a length of the scattered data from the memory start address thereof; and a destination base address field for indicating a destination address of the to-be-transmitted scattered data.

When the CPU writes the storing memory address of the SG-List into the register, the PCI-Express interface reads the Scatter-Gather data (SG data) in the SG-List according to the memory address in the register, and operates according to the SG data in the SG-List. For example, after reading control information in a header according to the memory address in the register, written by the CPU, and reading the SG data in turn based on the count indicated in the list entry count field, the whole SG-List is stored in a buffer. The PCI-Express interface establishing the inter-controller communication channel (ICC) then reads each SG data, based on its source base address field and data length field, and transmits the scattered data and its the destination base address field, to a PCI-Express interface of the second SVC via the ICC. The PCI-Express interface of the second SVC receives the information, and stores the scattered data according to the destination base address.

The SG-List may further comprise a first interrupt field for determining whether a first interrupt signal is generated by the PCI-Express interface establishing the ICC after completing data transmission instructed in the SG-List, and a second interrupt field for determining whether a second interrupt signal is generated by the destination end (the second SVC) to inform the CPU thereof after the scattered data is written to the corresponding destination base address.

If the SG-List has the first and the second interrupt fields, then the PCI-Express interface establishing the ICC transmits content of the second interrupt field, so that the ICC interface of the second SVC operates according to the second interrupt field, for example, 1 for generating an interrupt signal to the CPU thereof, and 0 for not. The ICC interface determines whether an interrupt signal is generated to the CPU based on the first interrupt field of the SG-List, after completing the data transmission instructed in the SG-List, for example, 1 for generating and 0 for not.

Further, because a single SG-List may not be able to comprise all SG data due to memory space allocation, multiple SG-Lists may be deployed to resolve this issue. Referring to FIG. 12, the format of the SG-List further comprises a next SG-List address field for indicating a memory address for a next SG-List. When the ICC interface reads the next SG-List field of the SG-List, the memory address of the next SG-List is known thereby, and the next SG-List is read according to the address thereof, such that a connection relationship between the SG-Lists is established. Upon reaching the last SG-List, the next SG-List address field is set to 0. The CPU does not have to write the address of all SG-Lists into the register, but just write the address of the first one, the ICC interface will complete all SG-lists with connection relationship automatically.

Figure 13:
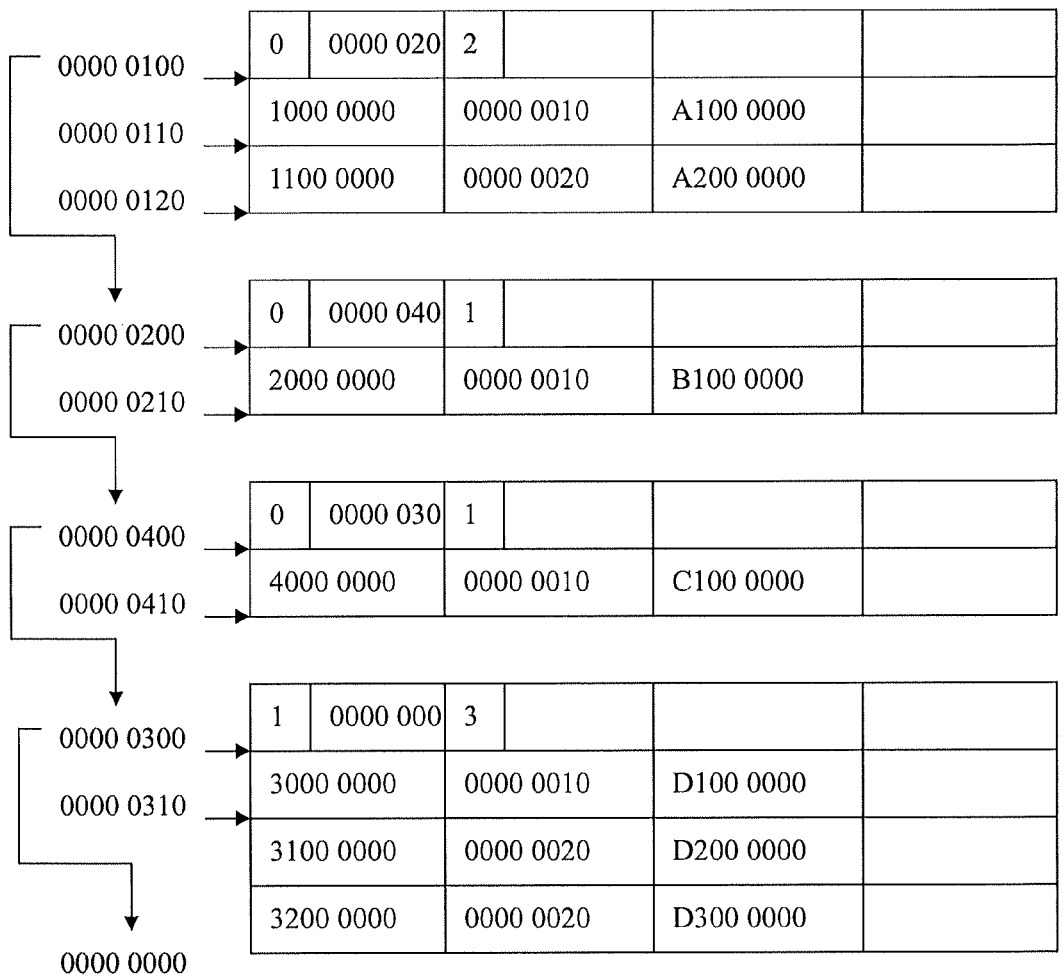
FIG. 13 shows another memory allocation of exemplary SG-Lists for data transmission.

FIG. 13 shows memory allocation of exemplary SG-Lists in the embodiment. If a CPU receives a request from a host entity, the request-related message and information are stored in various locations in memory via a CPU chipset, the CPU generates four SG-Lists according to the data transfer protocol format.

Referring to FIG. 13, the address of the first SG-List is stored at 0000_0100. After the SG-Lists are established, the CPU only writes a message containing the address 0000_0100, to the register belonging to the ICC interface in the CPU chipset, and the PCI-Express interface of the ICC reads the information in the SG-List at the memory address 0000_0100, obtains the control information (including the first interrupt, the next SG-List address, list entry count fields), reads, based on the count "2" at the list entry count field, the SG data at 0000_0110 and 0000_0120 including the source base address, data length, and destination base address fields. The PCI-Express interface reads the scattered data to the buffer based on the source base address (10000000) and the data length (0000_0010) in the first SG data, and transmits the scattered data and its destination base address (A100_0000) to the second SVC. The reading and transmission of each scattered data may be performed in turn depending on the actual capacity of the buffer. The PCI-Express interface then completes reading and transmission of each scattered data in turn based on the preceding method. For example, the PCI-Express interface reads the second scattered data to the buffer according to the source base address (1100_0000) and the data length (0000_0020), and transmits the second scattered data and its destination base address (A200_0000) to the second SVC. After all scattered data in the first SG-List have been read and transmitted, because the first interrupt field in the first SG-List is 0, the PCI-Express interface of the ICC reads the second SG-List at memory address 0000_0020 according to information in the next SG-List address field (0000_020) without an interrupt signal to the CPU. In the same manner, content of the second SG-List is obtained and the scattered data therein are transmitted, the address of the third SG-List is read at the next SG-List address field. In this manner, each SG-List is completed in sequence until the next SG-List address field is 0000_000 (as shown in the fourth SG-List). In the embodiment, the first interrupt field of the fourth SG-List is 1, thus after the data transmission of the fourth SG-List is completed, the PCI-Express interface of the ICC generates an interrupt signal to the CPU, and the CPU recognizes that the data transmission of the fourth SG-List is completed.

Through aforesaid method, the CPU only needs to transmit the first SG-List address to the CPU chipset during performing a redundant data transmission procedure, the CPU chipset subsequently reads and transmits the scattered data without work resource of the CPU. Moreover, the ICC interface reports, based on the first interrupt field, to the CPU in the SG-List upon completion of the data transmission, so that the CPU recognizes that the scattered data has already been transmitted to the second SVC, and free memory space where the completed SG-List is stored. It may report to the CPU upon completion of each SG-List, i.e., the first interrupt field of each SG-List is set to be 1, or report to the CPU upon completion of all SG-Lists with connection, i.e., until the next SG-List address field is 0000_000, as shown in the embodiment, where only the first interrupt field of the last SG-List is 1 and the first interrupt fields of the other SG-List are 0. In the former case, since a response is produced upon completion of each SG-List, the memory space may be free for better flexibility and efficiency. The implementation of the interrupt response is subject to the CPU to make a decision based on the actual condition.

In general, because the two SVCs in a redundant storage virtualization subsystem have to be synchronous, the first SVC has to inform the second SVC of any change, considered that the I/O operation of the system on-line is usually busy, there may be a constant demand to transfer new information or message to the other SVC.

Another embodiment of the present invention is provided as follows, including steps in the previous method.

When the PCI-Express interface of the ICC is processing a SG-List, the CPU chipset receives a new message or information to establish a corresponding new SG-List based thereon, and the CPU may insert the new SG-List into or continue the previous unfinished SG-List. For example, modifying the next SG-List address field of an unprocessed SG-List connected to the processed SG-List in the PCI-Express interface, or the next SG-List address to be processed in the register, such that the source base address of the new SG-List is included, is connected to the previous SG-Lists, and the PCI-Express interface can process the new SG-List in linking procedure automatically.

Figure 17:
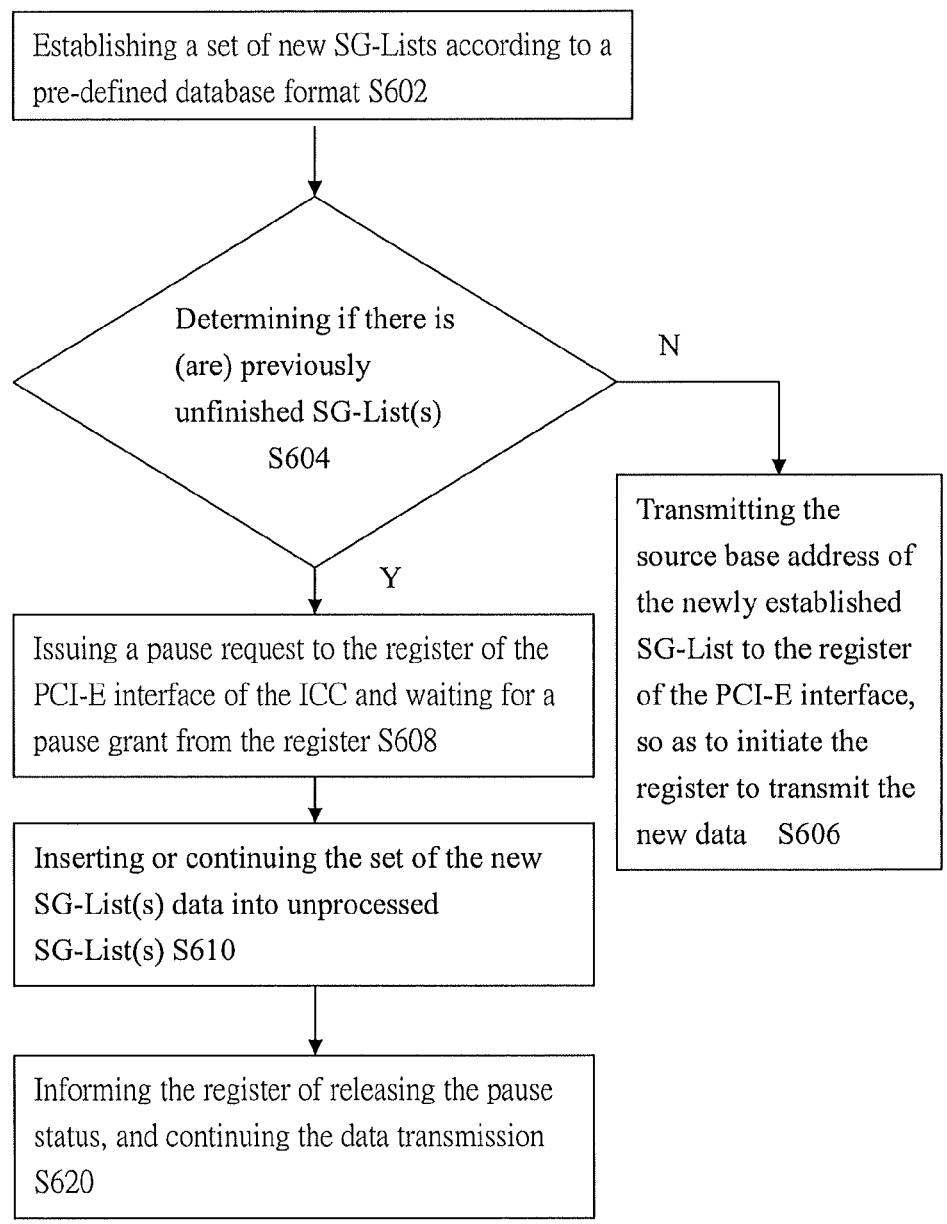
FIG. 17 is a flowchart of exemplary data transmission performed by a CPU according to the present invention.

FIG. 17 is a flowchart of exemplary data transmission by CPU in the embodiment. Please refer to FIG. 17 for a detailed description, the CPU chipset receives and stores the new information in the memory, and informs the CPU. The CPU establishes several linked SG-Lists based on the new information in step S602.

In step S604 the CPU determines if there are previous unfinished SG-Lists, which can be known through the fact that the PCI-Express interface of the ICC issues an interrupt signal to the CPU. If the CPU does not receive any interrupt signal, then the CPU recognizes that there is scattered data which has been triggered but has not yet been transmitted before data transfer. If there is no unfinished SG-List, the source base address of the newly established SG-List is written to the register of the ICC, and the PCI-Express interface of the ICC initiates a data transmission procedure in step S606.

If there is an unfinished SG-List, the CPU issues a pause request to the PCI-Express interface of the ICC to request the PCI-Express interface to pause the operation in step S608. Upon reception of the request, the interface performs a pause operation at a proper timing, and returns a pause grant to the CPU after a pause. The pause operation may be pausing the reading and transmission of the scattered data upon completion of transmitting a processing scattered data, and may be recording the pause point, so that the pause may be exited and the subsequent process may be resumed. Alternatively the pause operation may be transmitting all scattered data in the processing SG-List then pausing the next SG-List. In Step S610, upon receipt of the pause grant, the CPU inserts or continues the linking procedure, selecting the register or an unprocessed SG-List of the previous set of SG-Lists, configuring the next SG-List address field of the last SG-List in the newly established SG-Lists to be consistent with the next SG-List address of the register or the unprocessed SG-List, and modifying the next SG-List address of the unprocessed SG-List in the register or the memory to be the source base address of the newly established SG-Lists (the storing address of the first SG-List), such that the insertion of the newly established SG-List into the previous SG-List is completed, and two sets of the SG-Lists are linked.

After the newly established SG-Lists and the previous SG-Lists are linked, the PCI-Express interface of the ICC is informed to release the pause status, and the ICC interface resumes operation and performs the linking procedure according to the new link in step S620.

Before the CPU's linking the two sets of SG-Lists, the reason why the pause request is required is to prevent the conflicts and mistakes that would occur when the CPU modifies the next-SG-List address field in a SG-List or the register while the register is reading the content of the SG-List.

Figure 18:
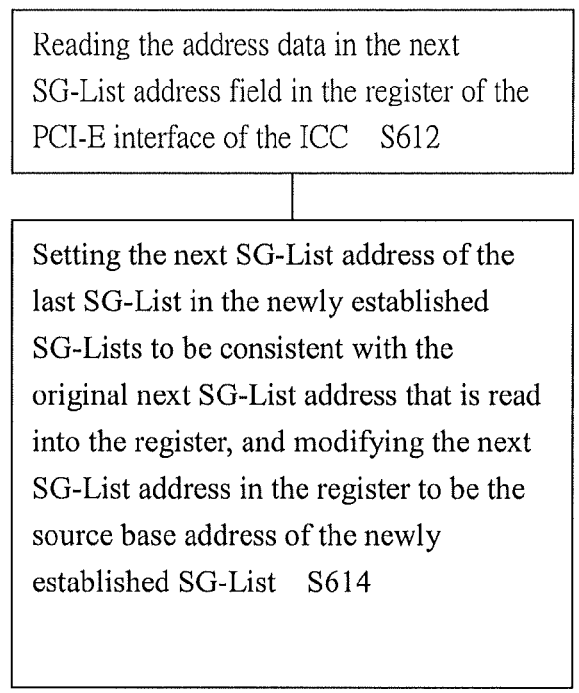
FIG. 18 is a flowchart of insertion or continuing linking procedure in FIG. 17.

The insertion or continuation of linking procedure is explained as follows. FIG. 18 is a flowchart of an insertion or continuing linking procedure in the embodiment. In the embodiment, the newly established SG-Lists are inserted after the processing SG-Lists. Since the ICC interface obtains content of a SG-List prior to performing the SG-List, the CPU can identify by reading the next SG-List address field in the register, if there is a next SG-List to be processed by the PCI-Express interface or the location of the next SG-List to be processed. Therefore, in the first step of the insertion or continuation linking procedure, the CPU reads the address data in the next SG-List address field of the processed SG-List in the register (step S612). In step 614, the CPU obtains the next SG-List address information to be processed by the PCI-Express interface, and sets the next SG-List address of the last SG-List in the newly established SG-Lists to be consistent with the original next SG-List address, and modifies the next SG-List address in the register to be the storing start address of the newly established SG-List (the address of the first SG-List), thereby completing the insertion of the newly established SG-Lists into the previous SG-Lists and linking the two sets of SG-Lists. In other words, the newly established SG-Lists are inserted between the processing SG-List and the SG-List to be processed. Upon completion of data transmission corresponding to the newly established SG-Lists, the previous unfinished SG-Lists are resumed from the insertion point. If the insertion point is just after the last SG-List (the next SG-List address in the register is 0000_000), it does not resume the previous SG-Lists because the previous SG-Lists are completed.

Figure 14:
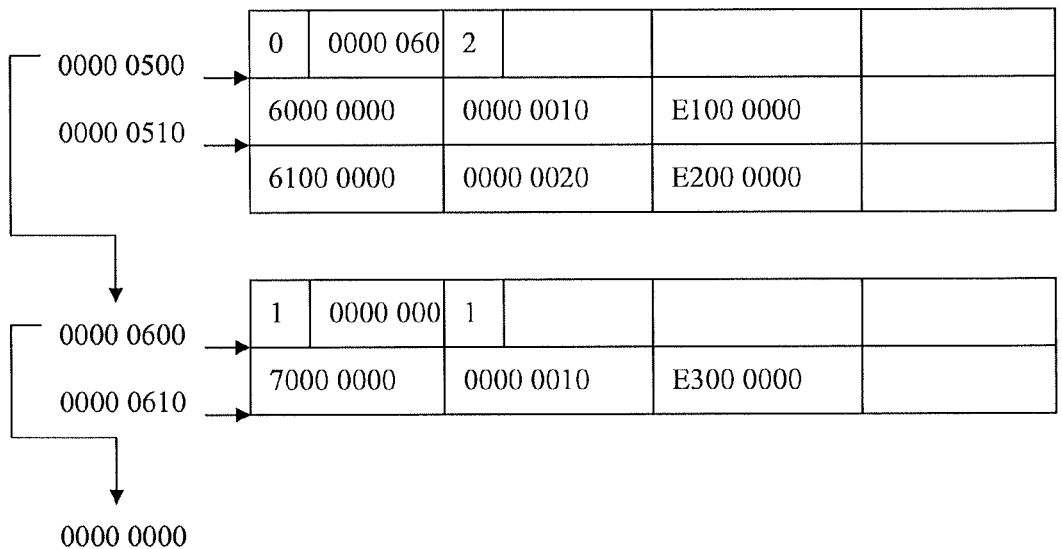
FIG. 14 shows yet another memory allocation of exemplary SG-Lists for data transmission.

Take FIG. 13 for example and please refer to FIG. 14. At first, as shown in FIG. 13, the CPU establishes four SG-Lists with links therebetween according to the storage address of the scattered data to be transmitted to the other SVC, writes the address message including the first SG-List to the register of the PCI-Express interface in the inter-controller communication channel ICC, the interface reads the SG-List according to the address message in the register, and performs reading and data transmission.

The CPU chipset further receives and stores new data into the memory then informs the CPU, the CPU in response establishes several linked new SG-Lists (referring to FIG. 14), so that the new data may be transmitted to the other SVC. Although here several SG-Lists and SG data are taken for example, in practice a single SG-List or single SG data may be produced because of actual data flow and memory space allocation.

When the CPU establishes the SG-Lists corresponding to the new data as shown in FIG. 14, if the PCI-Express interface of the ICC has not completed the four SG-Lists in FIG. 13, then the CPU can issue a pause request to the PCI-Express interface to request that the PCI-Express pauses entering into the operation of the next SG-List. Upon reception of the request, the interface performs the pause operation to pause all operation and replies a pause grant to the CPU. Upon reception of the pause grant, the CPU starts a linking process, and the CPU reads the next SG-Lists address field in the register.

If the interface is processing the second SG-List in FIG. 13 and the address message read by the CPU is 0000_040. Subsequently, the CPU sets the next SG-List address field of the last SG-List in FIG. 14 to 0000_040, and the next SG-List address in the register to 0000_050 (the address of the first SG-List in FIG. 14), and the new established SG-Lists in FIG. 14 are inserted between the second and the third SG-Lists in FIG. 13.

While receiving the pause request from the CPU, if the ICC interface is processing the fourth (the last) SG-List in FIG. 13, the CPU reads the next SG-List address in the register at 0000_000, and the next SG-List address of the last SG-List of the newly established SG-Lists remains 0000_000 without modification, consistent with the reading of the next SG-List address field in the register. The next SG-List address field in the register is changed to 0000_050 (the address of the first SG-List in FIG. 14).

Upon completion of the linking procedure, the CPU then issues a notification of releasing the pause status to the ICC interface, and the interface releases the pause operation thereby and continues the operations before the pausing. After completing processing the SG-List before the pausing, the PCI-Express interface then reads the first SG-List of the newly established SG-Lists according to the next SG-List address written in the register during the pause duration, and proceeds in turn the data transmission corresponding to the SG-Lists with links.

Figure 19:
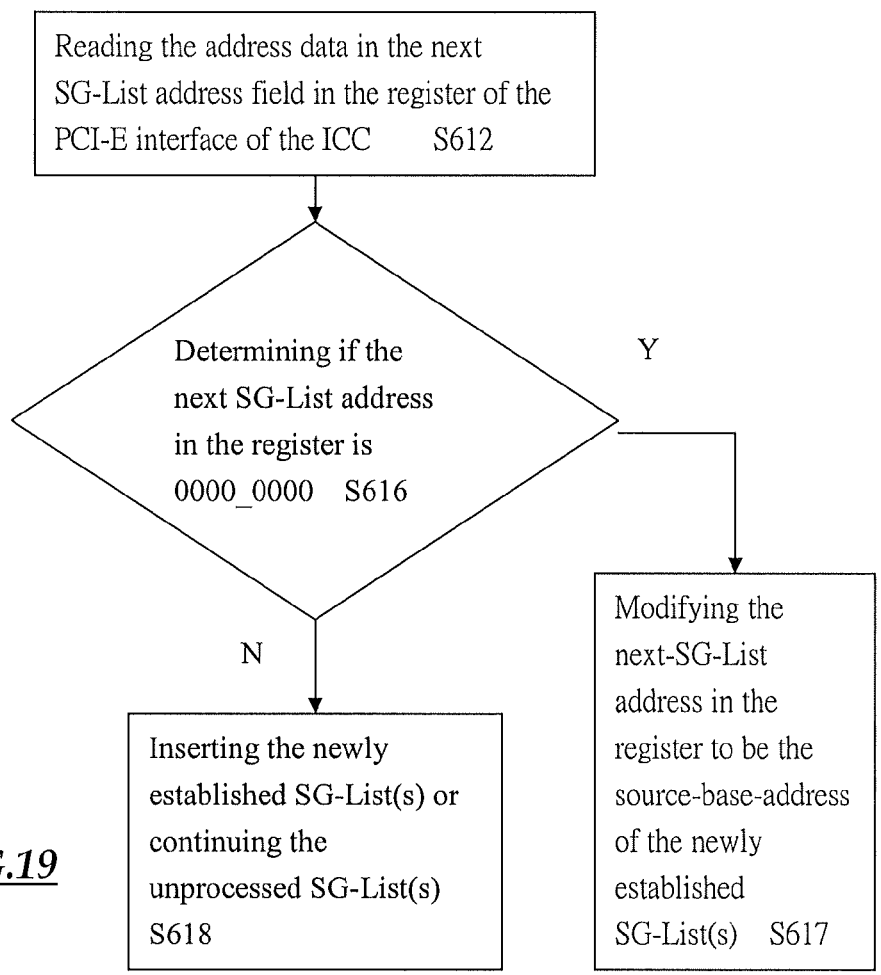
FIG. 19 is an another flowchart of insertion or continuing linking procedure in FIG. 17.

Please refer to FIG. 19 that is another embodiment of insertion and continuous linking procedure of the invention, which is different from FIG. 18 in that a link insertion point that is selected by the present embodiment is between SG-Lists or after SG-List, which has (have) not yet been processed by the ICC interface.

As shown in FIG. 18, the first step for the CPU to insert the linking procedure is that the CPU reads the next-SG-List address of the SG-List that is being processed in the register (S612). In step S616, the CPU determines if the address in the register is 0000_000, thereby identifying if there is a subsequent SG-List to be processed. If the address is set to 0000_000, then there is no subsequent SG-List to be processed. Therefore, the CPU modifies the next SG-List address field in the register to be the address storing the first SG-List of the newly established SG-Lists in step S617, so as to complete the linking procedure between the two sets of the SG-Lists.

If the next SG-List address field in the register is not 0000_000, this means that there is an unfinished SG-List to be processed, and the CPU selects an unfinished SG-List for the insertion process. The next SG-List address field in the selected SG-List in the memory is read and set to be the next SG-List address field of the last SG-List of the newly established SG-Lists, the next SG-List address field in the selected SG-List in the memory is changed to be the address of the first SG-List of the newly established SG-Lists, and the linking procedure is thus completed in step S618.

For example, the CPU selects the last SG-List of the previous set of SG-Lists to perform the linking procedure. Since the next SG-List address field of the last SG-List of the previous set is consistent with the next SG-List address field of the last SG-List of the newly established SG-Lists (both are 0000_000), only the next SG-List address of the last SG-List of the previous set is required to be modified to the start address of the newly established SG-Lists, thereby the linking of the two sets of SG-Lists is completed. Under this condition, the PCI-Express interface of the inter-controller communication channel ICC processes the previous set of SG-Lists after the pause status is released, and subsequently proceeds the newly established SG-Lists. The newly established SG-Lists are inserted after the previous set of SG-Lists. To find the last SG-List of the former set of SG-Lists, a table which stores memory addresses of all SG-Lists may be created and looked up. Alternatively, the address message of the next SG-List address field in the register is read, and the next-SG-List address field of the SG-List stored in the read address is read. However, if the next-SG-List address is still not 0000_000, then sequentially read the next-SG-List address of the next SG-List until the next-SG-List address is 0000_000.

Similarly, take FIGS. 13 and 14 for example. Similarly, if the ICC receives a pause request from the CPU while processing a SG-List in FIG. 13, then the register performs the pause operation, and transmits a pause grant to the CPU upon completion of the pause operation. The CPU then reads the next SG-List address field in the register. If the Next SG-List address field in the register is 0000_000, such as, the inter-controller communication channel ICC is processing the fourth SG-List in FIG. 13, then the Next SG-List address in the register is changed from 0000_000 to the address (0000_050) of the first SG-List of the SG-Lists to be linked in FIG. 12, thereby linking the two sets of SG-Lists together. Next, that is released from the pause status, and the ICC continues the operation before the pause operation. After three scattered data in the fourth SG-List are transmitted, the newly established SG-Lists in FIG. 14 are processed according to the address (0000_050) of the Next SG-List Address field in the register.

Figure 15:
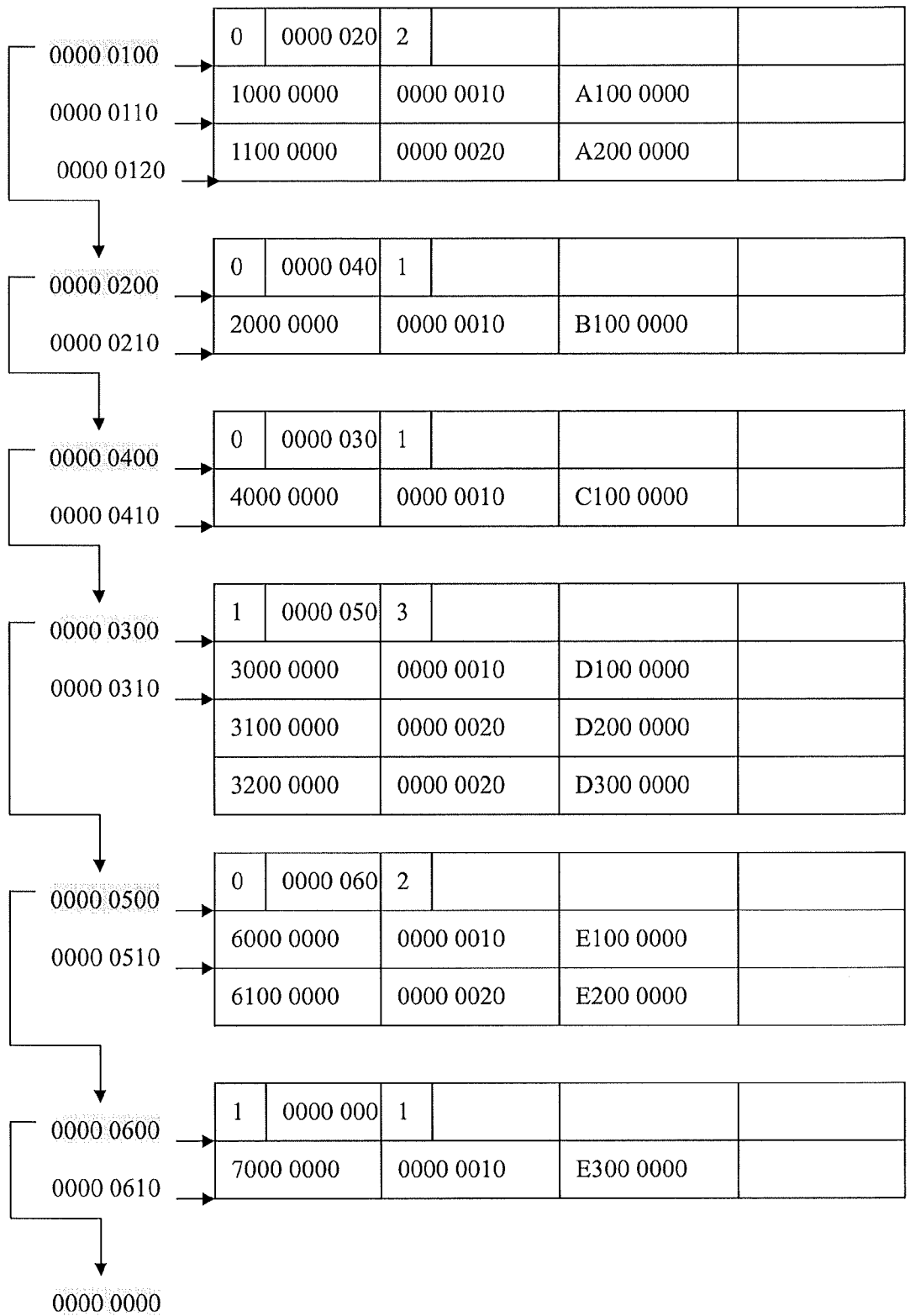
FIG. 15 shows still another memory allocation of exemplary SG-Lists for data transmission.

If the Next SG-List address read into the register is not 0000_000, such as the ICC is processing and is paused at the second SG-List in FIG. 13, then the address in the Next SG-List address field in the register is 0000_040; thus, after the CPU reads the field, it will recognize that the address of the SG-List which the PCI-E has not proceed with but will sequentially proceed with, is 0000_040. Next, the CPU selects an insertion point based on the condition or the system configuration. For example, the insertion point is selected after the last SG-List. The CPU obtains the Next SG-List address field 0000_030 of the third SG-List according to the address 0000_400. Because it is not 0000_000, the register obtains the Next SG-List address field (0000_000) of the fourth SG-List according to the address 0000_0300. Because it is 0000_000, this means that there is no linked SG-List thereafter, and the last SG-List is found. Upon finding the last SG-List, the Next SG-List address field thereof is changed from 0000_000 to the address storing the first SG-List in FIG. 14 (0000_050), so as to link the two sets of SG-Lists (as shown in FIG. 15), and then the register is informed of releasing the pause status, so that the register sequentially completes the data transmission corresponding to each SG-List in turn. In other words, the register continues the operations before the pause. After the register processes the second SG-List of the former set of the SG-Lists, the register sequentially processes the third SG-List and the fourth SG-List. After the register processes the last SG-List (storing address 0000_0300 of the fourth SG-List) of the former set of the SG-Lists, the register will process the later set of SG-Lists without transmitting any message from the CPU.

Figure 16:
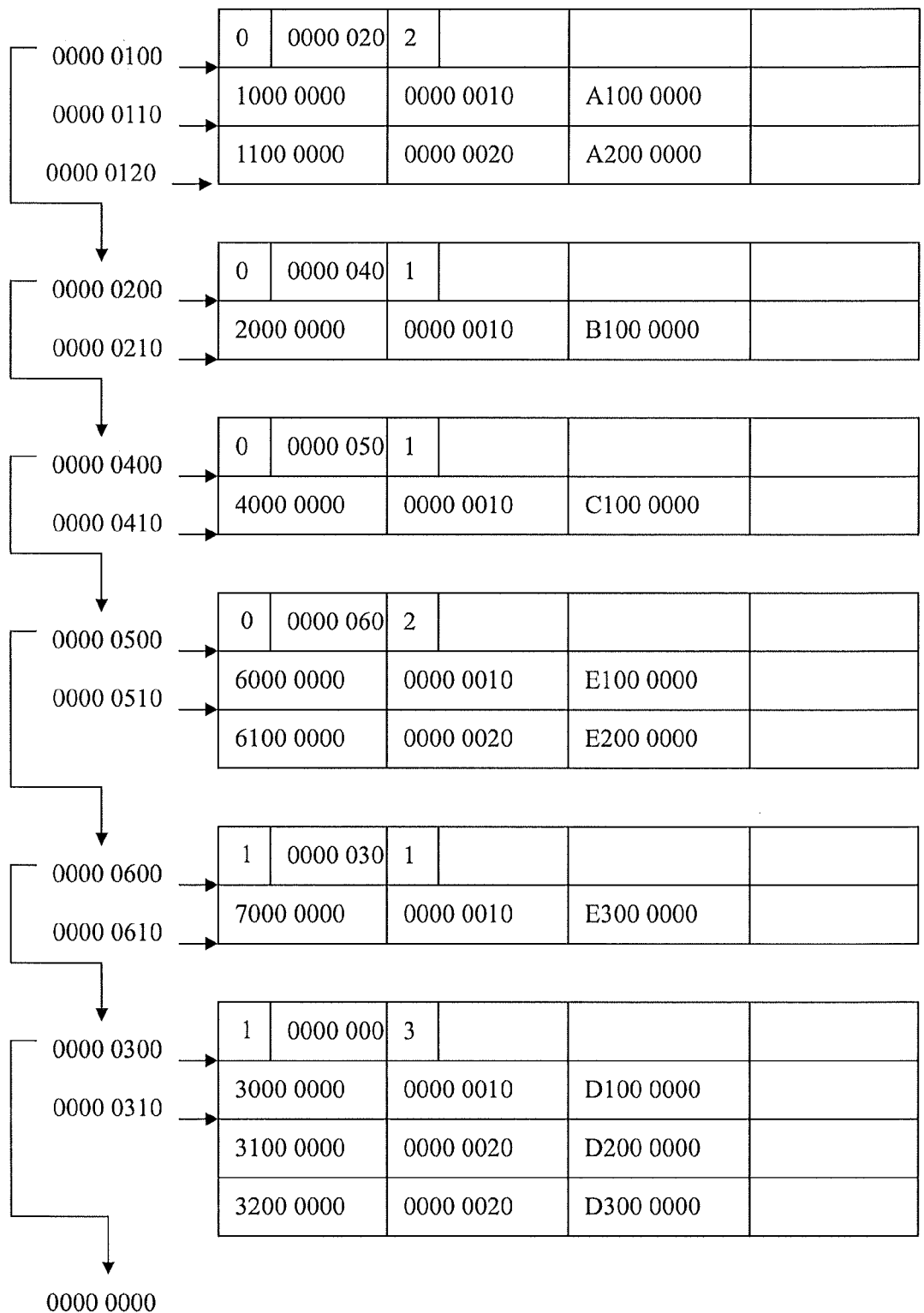
FIG. 16 shows still another memory allocation of exemplary SG-Lists for data transmission.

Alternatively, the ICC interface may insert the newly established SG-Lists after the next SG-List to be processed by the register. The CPU reads the next SG-List address field in the register (0000_040), obtains, at the memory address 0000_0400, the next SG-List address field 0000_030, changes the memory thereof to the address (0000_050) of the first SG-List of the newly established SG-Lists in FIG. 14, and writes the next SG-List address field (0000_030) of the previous set of SG-Lists into the next SG-List address field of the last SG-List of the newly established SG-Lists in FIG. 14, so that these is a link relationship between the two sets of SG-Lists. (as shown in FIG. 16). The CPU then notifies the ICC interface to release the pause status and complete the data transmission corresponding to each SG-List in turn. The ICC interface continues the operations before the pause operation, completes the third SG-List in FIG. 13, processes the newly established SG-Lists in FIG. 14, and finally finishes the last SG-List of the previous set of SG-Lists (the fourth SG-List at the memory address 0000_0300) without CPU's issuing any message.

Of course, in addition to selecting the last one or the SG-List that is after the register as the insertion point, the insertion point that is selected can also be the second or the third SG-List to be processed, as long as not later than the last SG-List. As shown in the aforesaid embodiment, when the new data to be transmitted is generated, as long as the ICC interface is transmitting a group of data, the link relationship between the new data and old data is generated through the aforesaid mechanism, so that the CPU can transmit the start address of the SG-List(s) of the new data to the register and trigger the register of the ICC interface without waiting for a report regarding completion of transmitting the old data, in which the report is transmitted from the ICC interface. The ICC interface will process the new data automatically. Theoretically, in the operations of redundant storage virtualization subsystem 20, one SVC keeps transmitting data to the other SVC continuously, new data will be generated before the completion of data transmission of one or multiple data to the other SVC. Through the method of the present invention, the CPU establishes and maintains the SG-List corresponding to the data transmission, and after the redundant storage virtualization subsystem is switched on, writes the memory address of the first SG-List into the register of the inter-controller communication channel ICC interface. After that, the ICC interface continues to read and transmit data, which will share the workload of the CPU and enhance the efficiency of the CPU.

When there is a need for integration or cancellation of certain SG-Lists, the CPU may, as in the insertion or continuation linking procedure, read the next SG-List address field in the register to determine if there is a next SG-List to be processed by the PCI-E interface or where the location of the next SG-List is. In other words, the CPU may identify the SG-List that has not been processed by the ICC interface. The CPU may determine if the SG-Lists to be integrated, modified, or cancelled are the SG-Lists that have not been processed by the ICC interface. If yes, then the CPU performs the integration, modification or cancellation of the SG-Lists.

Of course, when the CPU performs the aforesaid modification or cancellation, before reading the information in the register, the CPU may issue a pause request to pause the data transmission in the ICC interface before the CPU performs the modification or cancellation operations and reads the information in the register, and performs the read operation after receiving a pause grant from the ICC interface. In doing so, conflict that is caused when the ICC interface keeps transmitting scattered data while the CPU performs the modification or cancellation operation, can be prevented. Similarly, the CPU notifies the ICC interface to release the pause status upon completion of the modification or cancellation operations, so that the ICC interface can continue proceeding with the operations.

The CPU may combine, based on actual requirement, the insertion or continuing linking procedure, modification, and cancellation operations. For example, in one embodiment of the insertion and continuing linking procedure in FIG. 15, when the CPU modifies the next SG-List address field of the fourth SG-List in the memory, to be the source base address of the newly established SG-Lists, the first interrupt field of the SG-List is modified to 0, based on the actual requirement (for example, the CPU configures the ICC interface to produce an interrupt signal to CPU upon completion of the newly established SG-Lists) the ICC interface does not issue the interrupt signal to the CPU upon the completion of the fourth SG-List. In some embodiments, the next SG-List address field of the SG-List that has not been processed by the ICC interface is modified to reconfigure the links between the unprocessed SG-Lists to meet the actual requirements.

In addition to the aforesaid method of transmitting data to the other SVC and saving the data in the memory therein, if the redundant storage virtualization subsystem 20 is designed to have a SVC that can make data access (reading and writing) to the memory of the other SVC, then each of SG data in the SG-List may further comprise a data direction (Dir field as shown in FIG. 12) field indicating writing or read operation. For example, 1 represents data out, and 0 represents data in, as shown in FIG. 12.

The CPU writes the memory address of the SG-List into the register, and the ICC interface reads the SG data in the SG-List according to the address in the register, and operates according to the information in each field in the SG-List.

If the data direction field is set to data out, the interface reads the scattered data in turn according to the source base address field and the data length field of each scattered data, and transmits, via the ICC, the scattered data, the destination base address and the operation of data out, to the interface of the other SVC.

If the data direction field is set to data in, in one embodiment of a read operation, the ICC interface transmits content of the SG-List to the ICC interface of the other SVC. After the ICC interface of the other SVC receives and stores the data in the register, each scattered data is read in sequence according to the source base address field and the data length field thereof, the scattered data and the related information, such as the destination base address and the data length, are transmitted back to the ICC interface, and the ICC interface sequentially stores the scattered data in the memory. In another embodiment, not the entire content of the SG-List is transmitted to the other end, but just some related fields in the SG-List are transmitted, wherein the some related fields relates to the scattered data, and even are transmitted the related fields (e.g., the source base address and the data length) that relates to the scattered data in a batch manner. The data transmission may be performed with an instruction having a read operation. After receiving the scattered data from the other SVC according to the source base address and the data length, the scattered data is stored in the destination address thereof.

Through the aforesaid SG-List, transmission of the scattered data between the first SVC and the second SVC is achieved by the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for transmitting data between two storage virtualization controllers (SVCs), the two SVCs comprising a first SVC and a second SVC, in which the first SVC comprises a first bus interface and a first memory, the second SVC comprises a second bus interface and a second memory, and an inter-controller communication channel (ICC) is established between the first bus interface and the second bus interface, the method comprising the steps of:
   establishing, by the second SVC, a data transmission table in the second memory;
   transmitting, by the second SVC a first message to the first SVC, in which the first message comprises a block size of the data transmission table in the second memory;
   recording a block in which data have been read by the second SVC;
   transmitting, by the second SVC, a second message via the ICC through the second bus interface to the first SVC, in which the second message comprises a destination address of the recorded block of the second memory, and the recorded block is accessible;
   reading, by the first SVC, data in the first memory to be transmitted when the first SVC receives the second message;
   transmitting, by the first SVC, the data to be transmitted and the destination address to the second SVC via the ICC through the first bus interface; and
   storing, by the second SVC, the transmitted data into the second memory according the destination address.

2. The method according to claim 1, wherein the first SVC reads the data in the first memory to be transmitted according to a source address and a byte count of the data to be transmitted.

3. The method according to claim 1, wherein each of the SVCs comprises:
   a central processing circuit for performing an I/O operation in response to an I/O request from a host entity and for coupling to the other SVC via the bus interface;
   at least one I/O device interconnect controller coupled to the central processing circuit;
   at least one host-side port provided in the at least one I/O device interconnect controller for coupling to the host entity;
   at least one device-side port provided in the at least one I/O device interconnect controller for coupling to at least one physical storage device; and
   a memory coupled to the central processing circuit for buffering data transmitted between the host entity and the at least one physical storage device via the central processing circuit.

4. The method according to claim 3, wherein the central processing circuit comprises:
   a central processing unit (CPU); and
   a CPU chipset which is an interface between the CPU and other electronic components, the CPU chipset comprising:
      the bus interface for coupling to the other SVC;
      an internal main bus which is used as a communication connection among said other electronic components in the CPU chipset for communicating data signals and control signals; and
      a CPU interface coupled to the CPU and the internal main bus for communicating between the CPU and the other electronic components;
      a memory controller coupled to the memory and the internal main bus, in which when the memory controller receives the data transmitted from the internal main bus, the memory controller stores the data into the memory, and the data in the memory is transmitted to the internal main bus via the memory controller; and
      a third bus interface coupled to the at least one I/O device interconnect controller and the internal main bus for being an interface therebetween.

5. The method according to claim 4, wherein the CPU chipset further comprises a register belonging to the bus interface, and a third message associated with the data to be transmitted to the other SVC is written into a storage space of the register by the CPU.

6. The method according to claim 5, wherein the register is provided in the bus interface.

7. The method according to claim 1, wherein the first bus interface and the second bus interface are PCI-Express bus interfaces.

8. The method according to claim 1, wherein the data to be transmitted relate to data regarding control data.

9. The method according to claim 1, further comprising the step of: transmitting, by the second SVC, the second message to the first SVC, when one of blocks of the second memory of the second SVC is released, in which the second message comprises the destination address of the block.

10. The method according to claim 1, wherein the first and the second messages are a vendor-defined message or ignore message, both of which are defined by a PCI-Express.

11. A method for transmitting data between two storage virtualization controllers (SVCs), the SVCs comprises a first SVC and a second SVC, in which the first SVC comprises a first bus interface and a first memory, and the second SVC comprises a second bus interface and a second memory, and an inter-controller communication channel (ICC) is established between the first bus interface and the second bus interface, the method comprising the steps of:
   establishing, by the second SVC, a data transmission table in the second memory;
   transmitting, by the second SVC, a first message to the first SVC, in which the first message comprises a block size of the data transmission table in the second memory;
   recording a number of block in which data have been read by the second SVC, as a number of credit;
   transmitting, by the second SVC, the number of credit to the first SVC;
   reading, by the first SVC, the data to be transmitted according to the number of credit, and transmitting the data to be transmitted, to the second SVC, when the first SVC receives the number of credit from the second SVC; and storing, by the second SVC, the transmitted data from the first SVC, into the data transmission table in the second memory of the second SVC, when the second SVC receives the transmitted data.

12. The method according to claim 11, wherein the first SVC reads the data in the first memory to be transmitted according to a source address and a byte count of the data to be transmitted.

13. The method according to claim 11, wherein each of the SVCs comprises:
a central processing circuit for performing an I/O operation in response to an I/O request from a host entity and for coupling to the other SVC via the bus interface;
at least one I/O device interconnect controller coupled to the central processing circuit;
at least one host-side port provided in the at least one I/O device interconnect controller for coupling to the host entity;
at least one device-side port provided in the at least one I/O device interconnect controller for coupling to at least one physical storage device; and
a memory coupled to the central processing circuit for buffering data transmitted between the host entity and the at least one physical storage device via the central processing circuit.

14. The method according to claim 13, wherein the central processing circuit comprises:
a central processing unit (CPU); and
a CPU chipset which is an interface between the CPU and other electronic components, the CPU chipset comprising:
the bus interface for coupling to the other SVC;
an internal main bus which is used as a communication connection among said other electronic components in the CPU chipset for communicating data signals and control signals; and
a CPU interface coupled to the CPU and the internal main bus for communicating between the CPU and the other electronic components;
a memory controller coupled to the memory and the internal main bus, in which when the memory controller receives the data transmitted from the internal main bus, the memory controller stores the data into the memory, and the data in the memory is transmitted to the internal main bus via the memory controller; and
an interface coupled to the at least one I/O device interconnect controller and the internal main bus for being an interface therebetween.

15. The method according to claim 14, wherein the CPU chipset further comprises a register belonging to the bus interface, and a second message associated with the data to be transmitted to the other SVC is written into a storage space of the register by the CPU.

16. The method according to claim 15, wherein the register is provided in the bus interface.

17. The method according to claim 11, wherein the first bus interface and the second bus interface are PCI-Express bus interface.

18. The method according to claim 11, wherein the data to be transmitted relate to data regarding control data.

19. The method according to claim 11, wherein the first message is a vendor-defined or ignore message, both of which are defined by a PCI-Express.

20. The method according to claim 11, wherein data of the data transmission table comprises a base address, a data length and the block size.

21. The method according to claim 1, further comprising steps of:
reading, by the first SVC, data in the first memory to be transmitted and transmitting the data into the data transmission table in the second memory, when the first SVC receives the first message; and
reading, by the second SVC, the data in the block of the data transmission table in the second memory.

22. The method according to claim 11, further comprising steps of:
reading, by the first SVC, data in the first memory to be transmitted and transmitting the data into the data transmission table in the second memory, when the first SVC receives the first message; and
reading, by the second SVC, the transmitted data in the number of block of the data transmission table in the second memory.

* * * * *